(12) United States Patent
Yoshimura et al.

(10) Patent No.: US 8,389,164 B2
(45) Date of Patent: Mar. 5, 2013

(54) NONAQUEOUS ELECTROLYTIC SOLUTION, POSITIVE ELECTRODE AND NONAQUEOUS ELECTROLYTE SECONDARY BATTERY

(75) Inventors: Kentaro Yoshimura, Fukushima (JP); Tadahiko Kubota, Kanagawa (JP)

(73) Assignee: Sony Corporation, Tokyo (JP)

( * ) Notice: Subject to any disclaimer, the term of this patent is extended or adjusted under 35 U.S.C. 154(b) by 368 days.

(21) Appl. No.: 12/777,620

(22) Filed: May 11, 2010

(65) Prior Publication Data

US 2010/0304224 A1 Dec. 2, 2010

(30) Foreign Application Priority Data

May 28, 2009 (JP) ................ P2009-128766

(51) Int. Cl.
*H01M 10/0564* (2010.01)
*H01M 10/05* (2010.01)
*H01M 4/02* (2006.01)
*H01M 4/13* (2010.01)

(52) U.S. Cl. ......... 429/326; 429/188; 429/209; 429/212

(58) Field of Classification Search ................ 429/326, 429/188, 209, 212
See application file for complete search history.

(56) References Cited

U.S. PATENT DOCUMENTS

| | | | |
|---|---|---|---|
| 5,776,627 A | 7/1998 | Mao et al. | |
| 5,879,834 A | 3/1999 | Mao | |
| 6,033,797 A | 3/2000 | Mao et al. | |
| 6,156,459 A * | 12/2000 | Negoro et al. | 429/322 |
| 6,277,525 B1 * | 8/2001 | Yamamoto et al. | 429/326 |
| 6,632,572 B1 | 10/2003 | Takahashi et al. | |
| 2004/0191611 A1 * | 9/2004 | Imachi et al. | 429/62 |
| 2007/0015063 A1 * | 1/2007 | Ogawa et al. | 429/330 |

FOREIGN PATENT DOCUMENTS

| | | |
|---|---|---|
| JP | 10-32158 | 12/1998 |
| JP | 2983205 | 9/1999 |
| JP | 3061756 | 4/2000 |
| JP | 3061759 | 4/2000 |
| JP | 3113652 | 9/2000 |
| JP | 2002-222663 | 8/2002 |
| JP | 2006-73308 | 3/2006 |

* cited by examiner

*Primary Examiner* — Jessee R. Roe
(74) *Attorney, Agent, or Firm* — K&L Gates LLP

(57) ABSTRACT

A nonaqueous electrolytic solution includes an electrolyte salt dissolved in a nonaqueous solvent, wherein the nonaqueous electrolyte solution contains at least one compound selected from the group consisting of a chain compound having a hydroxyl group and a carbon-carbon double bond, a light metal alkoxide thereof and a derivative thereof obtained by substituting the hydroxyl group with a protective group.

13 Claims, 4 Drawing Sheets

NONAQUEOUS ELECTROLYTIC SOLUTION, POSITIVE ELECTRODE AND NONAQUEOUS ELECTROLYTE SECONDARY BATTERY

CROSS REFERENCES TO RELATED APPLICATIONS

The present application claims priority to Japanese Priority Patent Application JP 2009-128766 filed in the Japan Patent Office on May 28, 2009, the entire contents of which is hereby incorporated by reference.

BACKGROUND

The present application relates to a nonaqueous electrolytic solution, a positive electrode and a nonaqueous electrolyte secondary battery using the same. The present application relates to a nonaqueous electrolytic solution which has a high capacity, high in safety even under an overcharge condition and excellent in cycle characteristic and high-temperature characteristic, a positive electrode and a nonaqueous electrolyte secondary battery using the same.

Owing to the remarkable development of a portable electronic technology in recent years, electronic appliances such as mobile phones and laptop personal computers have started to be recognized as a basic technology supporting a high-level information society. Also, research and development on high functionalization of such an electronic appliance are energetically advanced, and the consumed electric power of such an electronic appliance increases steadily in proportion thereto. On the contrary, such an electronic appliance is to be driven over a long period of time, and realization of a high energy density of a secondary battery as a drive power source has been inevitably desired. Also, in view of consideration of the environment, the prolongation of a cycle life has been desired.

From the viewpoints of occupied volume and mass of a battery to be built in an electronic appliance, it is desirable that the energy density of the battery is as high as possible. At present, in view of the fact that a lithium ion secondary battery has an excellent energy density, the lithium ion secondary battery is now built in almost all of appliances.

Usually, the lithium ion secondary battery uses lithium cobaltate for a positive electrode and a carbon material for a negative electrode, respectively and is used at an operating voltage in the range of from 4.2 V to 2.5 V. The fact that in a single cell, a terminal voltage can be increased to 4.2 V largely relies upon excellent electrochemical stability of a nonaqueous electrolyte material or a separator.

For the purposes of realizing higher functionalization and enlarging applications on such a lithium ion secondary battery, a number of investigations are being advanced. As one of them, for example, it is studied to contrive to make a lithium ion secondary battery have a high capacity by enhancing an energy density of a positive electrode active material including lithium cobaltate.

However, in the case where charge and discharge are repeated at a high capacity, in particular, in a high-temperature region, not only an electrolytic solution coming into physical contact with a positive electrode is oxidized and decomposed, a gas is generated to cause defectives such as blister, rupture and liquid leakage of the battery; but at the time of overcharge, the electrolytic solution is decomposed on the positive electrode, and furthermore, deposition of metallic lithium on a negative electrode, an internal short circuit and the like are caused, thereby possibly remarkably impairing the safety.

Then, as a technique for securing the safety at the time of overcharge of a nonaqueous electrolytic secondary battery, there are proposed a method of using a previously installed safety device and a method of imparting resistance to overcharge to a battery itself.

For example, Japanese Patent No. 3061756 discloses a method in which a compound added to an electrolytic solution causes polymerization or the like at the time of overcharge to increase an internal resistance of a battery, thereby protecting the battery. Also, JP-A-10-321258 discloses a method in which a conductive polymer is formed at the time of overcharge to induce an internal circuit within a battery, thereby causing automatic discharge. Japanese Patent No. 3061759 discloses a method in which a gas is generated at the time of overcharge, thereby surely operating an internal current breaking device working at a prescribed internal pressure.

Japanese Patents Nos. 2983205 and 3113652 disclose that a benzene based compound is surely decomposed at a prescribed voltage to generate a gas, thereby enabling a battery to be protected at the time of overcharge. JP-A-2006-73308 discloses that in a nitrogen-containing heterocyclic derivative called a tetrazole, a gas is generated relying upon only a potential but not a temperature.

SUMMARY

However, as disclosed in Japanese Patent No. 3061756 and JP-A-10-321258, in the method of increasing an internal resistance of the battery by polymerizing a prescribed additive within the battery and the method of automatically discharging the battery, the internal resistance increases at the time of cycling, thereby bringing battery deterioration or deteriorating a self discharge characteristic, and therefore, these methods are not preferable. Also, as disclosed in Japanese Patents Nos. 3061759, 2983205 and 3113652 and JP-A-2006-73308, even in the method of surely operating the current breaking mechanism imparted to a battery itself, in a battery which is cycled at a high capacity, not only a gas is generated at the time of high-temperature storage to cause defectives such as blister of the battery, but the cycle characteristic is often deteriorated.

Thus, it is desirable to provide a nonaqueous electrolytic solution for nonaqueous electrolyte secondary batteries having excellent cycle characteristic and high-temperature characteristic as well as overcharge safety, a positive electrode and a nonaqueous electrolyte secondary battery using the same.

According to an embodiment, there is provided a nonaqueous electrolytic solution having an electrolyte salt dissolved in a nonaqueous solvent, wherein the nonaqueous electrolyte solution contains at least one compound selected from the group consisting of a chain compound having a hydroxyl group and a carbon-carbon double bond, a light metal alkoxide thereof and a derivative thereof obtained by substituting the hydroxyl group with a protective group.

The chain compound having a hydroxyl group and a carbon-carbon double bond, the light metal alkoxide thereof or the derivative thereof obtained by substituting the hydroxyl group with a protective group is preferably any one of compounds represented by the following formulae (1) to (6).

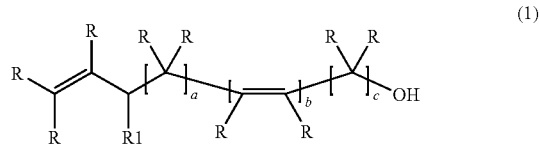

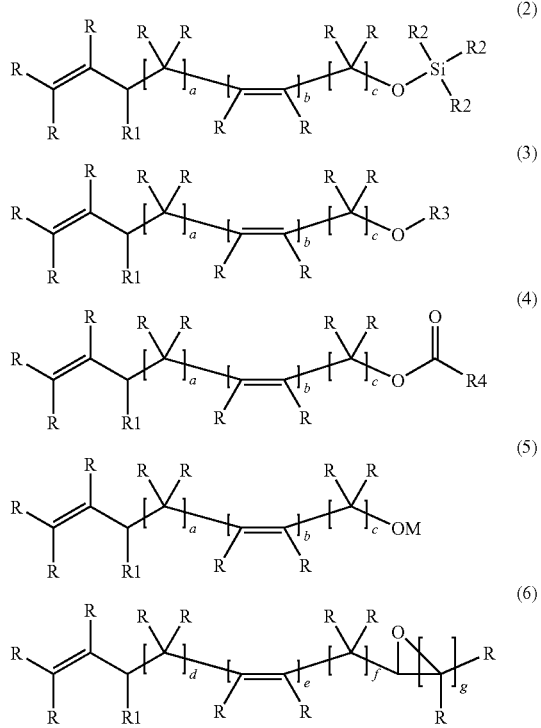

In the formulae (1) to (6), each of R and R1 represents a hydrogen atom, a halogen atom, a vinyl group, an alkyl group having from 1 to 4 carbon atoms or a halogenated alkyl group having from 1 to 4 carbon atoms in which at least one hydrogen atom is substituted with a halogen atom, and R and R1 may be the same as or different from each other; R2 represents a methyl group, an ethyl group, an isopropyl group, a tertiary butyl group or a phenyl group, and each R2 may be the same as or different from every other R2; R3 represents a hydrocarbon group having from 1 to 10 carbon atoms or a hydrocarbon group having from 1 to 10 carbon atoms, a part of which is substituted with a functional group containing a hetero element inclusive of oxygen (O) or silicon (Si); R4 represents a methyl group, a tertiary butyl group or an aryl group; M represents an alkali metal element; each of a, b and c represents an integer of from 0 to 5 and satisfies the relationship of $\{1 \leqq (a+2b+c) \leqq 5\}$; each of d, e and f represents an integer of from 0 to 4 and satisfies the relationship of $\{1 \leqq (d+2e+f) \leqq 4\}$; and g represents an integer of from 1 to 5.

According to another embodiment, there is provided a positive electrode including a positive electrode mixture containing a positive electrode active material, wherein the positive electrode mixture contains at least one compound selected from the group consisting of a chain compound having a hydroxyl group and a carbon-carbon double bond, a light metal alkoxide thereof and a derivative thereof obtained by substituting the hydroxyl group with a protective group.

The chain compound having a hydroxyl group and a carbon-carbon double bond, the light metal alkoxide thereof or the derivative thereof obtained by substituting the hydroxyl group with a protective group is preferably any one of compounds represented by the foregoing formulae (1) to (6).

According to still another embodiment, there is provided a nonaqueous electrolyte secondary battery including a positive electrode, a negative electrode, a separator and a nonaqueous electrolytic solution, wherein at least one of the nonaqueous electrolytic solution and the positive electrode contains at least one compound selected from the group consisting of a chain compound having a hydroxyl group and a carbon-carbon double bond, a light metal alkoxide thereof and a derivative thereof obtained by substituting the hydroxyl group with a protective group.

The chain compound having a hydroxyl group and a carbon-carbon double bond, the light metal alkoxide thereof or the derivative thereof obtained by substituting the hydroxyl group with a protective group is preferably any one of compounds represented by the foregoing formulae (1) to (6).

In accordance with the nonaqueous electrolytic solution and/or the positive electrode according to an embodiment, a nonaqueous electrolyte secondary battery having excellent cycle characteristic, high-temperature characteristic and overcharge safety and having a high capacity can be realized and provided.

Additional features and advantages are described herein, and will be apparent from the following Detailed Description and the figures.

DETAILED DESCRIPTION

The present application is described below in greater detail with reference to the figures according to an embodiment.

(First Embodiment)

Figure 1:
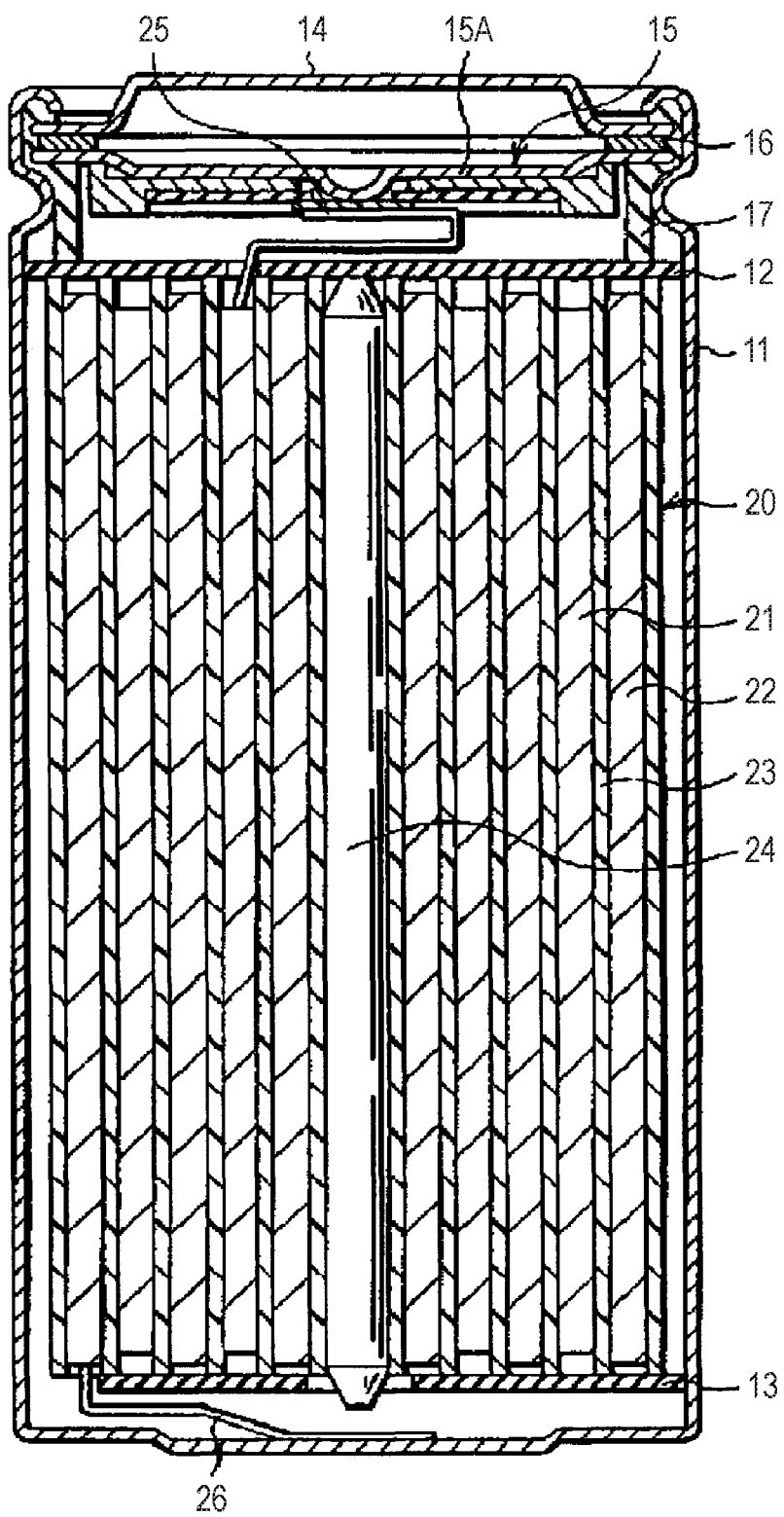
FIG. 1 is a sectional view showing a configuration of a secondary battery according to a first embodiment.

FIG. 1 shows a sectional structure of a nonaqueous electrolyte secondary battery according to an embodiment (hereinafter also referred to simply as "secondary battery"). This secondary battery is a so-called lithium ion secondary battery using lithium (Li) as an electrode reactant, in which the capacity of a negative electrode is expressed by a capacity component due to intercalation and deintercalation of lithium. This secondary battery is of a so-called cylindrical type and has a wound electrode body 20 having a pair of a strip-shaped positive electrode 21 and a strip-shaped negative electrode 22 wound via a separator 23 in the inside of a substantially hollow columnar battery can 11. The battery can 11 is constituted of, for example, nickel-plated iron, and one end thereof is closed, with the other end being opened. In the inside of the battery can 11, a pair of insulating plates 12 and 13 is respectively disposed vertical to the winding peripheral face so as to interpose the wound electrode body 20 therebetween.

In the open end of the battery can 11, a battery lid 14 is installed by caulking with a safety valve mechanism 15 and a positive temperature coefficient device (PTC device) 16 provided in the inside of this battery lid 14 via a gasket 17, and the inside of the battery can 11 is hermetically sealed. The battery lid 14 is constituted of, for example, the same material as that in the battery can 11. The safety valve mechanism 15 is electrically connected to the battery lid 14 via the positive temperature coefficient device 16. In this safety valve mechanism 15, when the internal pressure of the battery reaches a fixed value or more due to an internal short circuit or heating from the outside or the like, a disc plate 15A is reversed, whereby electrical connection between the battery lid 14 and the wound electrode body 20 is disconnected. When the temperature rises, the positive temperature coefficient device 16 controls the current by an increase of the resistance value, thereby preventing abnormal heat generation to be caused due to a large current. The gasket 17 is constituted of, for example, an insulating material, and asphalt is coated on the surface thereof.

For example, a center pin 24 is inserted on the center of the wound electrode body 20. In the wound electrode body 20, a positive electrode lead 25 constituted of a metal material, for example, aluminum, etc. is connected to the positive electrode 21; and a negative electrode lead 26 constituted of a metal material, for example, nickel, etc. is connected to the negative electrode 22. The positive electrode lead 25 is electrically connected to the battery lid 14 by means of welding with the safety valve mechanism 15; and the negative electrode lead 26 is electrically connected to the battery can 11 by means of welding.

[Positive Electrode]

Figure 2:
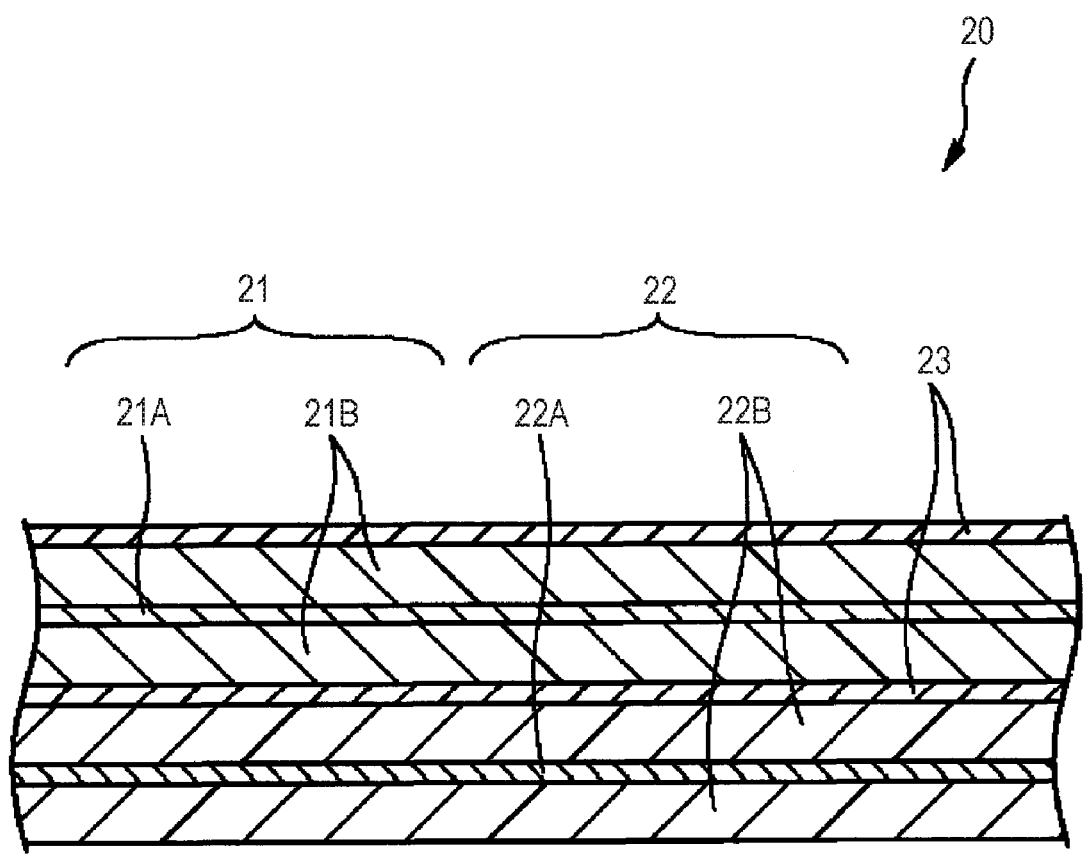
FIG. 2 is a sectional view showing enlargedly a part of a wound electrode body in the secondary battery shown in FIG. 1.

FIG. 2 is a sectional view showing enlargedly a part of the wound electrode body 20 shown in FIG. 1. The positive electrode 21 has, for example, a structure in which a positive electrode active material layer 21B is provided on the both surfaces of a positive electrode collector 21A having a pair of surfaces opposing to each other. While illustration is omitted, the positive electrode active material layer 21B may be provided on only one surface of the positive electrode collector 21A. The positive electrode collector 21A is constituted of a metal foil, for example, an aluminum foil, etc. The positive electrode active material layer 21B is constituted such that a positive electrode mixture contains, as a positive electrode active material, one or two or more kinds of positive electrode materials capable of intercalating and deintercalating lithium and at least one compound selected from the group consisting of a chain compound having a hydroxyl group and a carbon-carbon double bond, a light metal alkoxide thereof and a derivative thereof obtained by substituting the hydroxyl group with a protective group and further contains a conductive agent such as graphite and a binder such as polyvinylidene fluoride, if desired.

In an embodiment, by incorporating at least one compound selected from the group consisting of a chain compound having a hydroxyl group and a carbon-carbon double bond, a light metal alkoxide thereof and a derivative thereof obtained by substituting the hydroxyl group with a protective group into the positive electrode mixture, a high-energy density battery having a favorable cycle characteristic as well as excellent high-temperature storage characteristic and overcharge safety can be realized.

Examples of the chain compound having a hydroxyl group and a carbon-carbon double bond, the light metal alkoxide thereof and the derivative thereof obtained by substituting the hydroxyl group with a protective group include compounds represented by the following formulae (1) to (6).

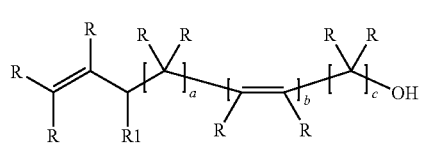

In the formula (1), each of R and R1 represents a hydrogen atom, a halogen atom, a vinyl group, an alkyl group having from 1 to 4 carbon atoms or a halogenated alkyl group having from 1 to 4 carbon atoms in which at least one hydrogen atom is substituted with a halogen atom, and R and R1 may be the same as or different from each other; and each of a, b and c represents an integer of from 0 to 5 and satisfies the relationship of $\{1 \leqq (a+2b+c) \leqq 5\}$.

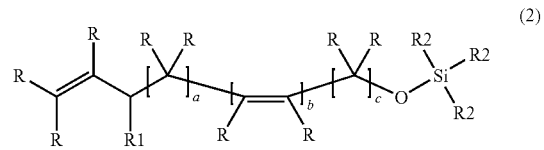

In the formula (2), each of R and R1 represents a hydrogen atom, a halogen atom, a vinyl group, an alkyl group having from 1 to 4 carbon atoms or a halogenated alkyl group having from 1 to 4 carbon atoms in which at least one hydrogen atom is substituted with a halogen atom, and R and R1 may be the same as or different from each other; R2 represents a methyl group, an ethyl group, an isopropyl group, a tertiary butyl group or a phenyl group, and each R2 may be the same as or different from every other R2; and each of a, b and c represents an integer of from 0 to 5 and satisfies the relationship of $\{1 \leqq (a+2b+c) \leqq 5\}$.

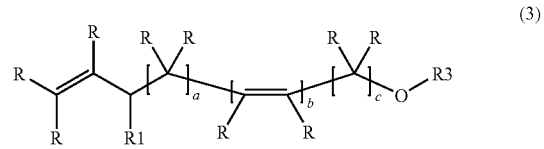

In the formula (3), each of R and R1 represents a hydrogen atom, a halogen atom, a vinyl group, an alkyl group having from 1 to 4 carbon atoms or a halogenated alkyl group having from 1 to 4 carbon atoms in which at least one hydrogen atom is substituted with a halogen atom, and R and R1 may be the same as or different from each other; R3 represents a hydrocarbon group having from 1 to 10 carbon atoms or a hydrocarbon group having from 1 to 10 carbon atoms, a part of which is substituted with a functional group containing a hetero element inclusive of oxygen (O) or silicon (Si); and each of a, b and c represents an integer of from 0 to 5 and satisfies the relationship of $\{1 \leqq (a+2b+c) \leqq 5\}$.

Examples of the hydrocarbon group include an alkyl group and an aryl group each having from 1 to 10 carbon atoms, for example, a methyl group, a tertiary butyl group, a benzyl group, etc. Examples of the hydrocarbon group containing oxygen (O) include a methoxymethyl group, a 2-tetrahydropyranyl group, a 1-ethoxyethyl group, a 1-methyl-1-methoxyethyl group, a 2-methoxyethoxymethyl group and a p-methoxybenzyl group. Examples of the hydrocarbon group containing oxygen (O) and silicon (Si) include a 2-(trimethylsilyl)ethoxymethyl group.

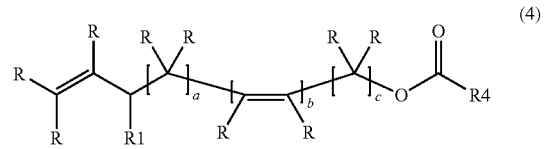

In the formula (4), each of R and R1 represents a hydrogen atom, a halogen atom, a vinyl group, an alkyl group having from 1 to 4 carbon atoms or a halogenated alkyl group having from 1 to 4 carbon atoms in which at least one hydrogen atom is substituted with a halogen atom, and R and R1 may be the same as or different from each other; R4 represents a methyl group, a tertiary butyl group or an aryl group; and each of a, b and c represents an integer of from 0 to 5 and satisfies the relationship of $\{1 \leq (a+2b+c) \leq 5\}$.

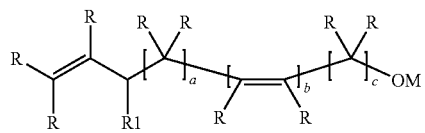
(5)

In the formula (5), each of R and R1 represents a hydrogen atom, a halogen atom, a vinyl group, an alkyl group having from 1 to 4 carbon atoms or a halogenated alkyl group having from 1 to 4 carbon atoms in which at least one hydrogen atom is substituted with a halogen atom, and R and R1 may be the same as or different from each other; M represents an alkali metal element; and each of a, b and c represents an integer of from 0 to 5 and satisfies the relationship of $\{1 \leq (a+2b+c) \leq 5\}$.

Examples of the alkali metal element include potassium (K), lithium (Li) and sodium (Na).

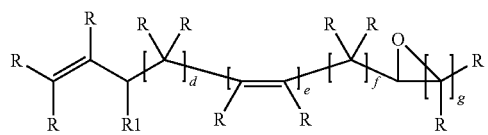
(6)

In the formula (6), each of R and R1 represents a hydrogen atom, a halogen atom, a vinyl group, an alkyl group having from 1 to 4 carbon atoms or a halogenated alkyl group having from 1 to 4 carbon atoms in which at least one hydrogen atom is substituted with a halogen atom, and R and R1 may be the same as or different from each other; each of d, e and f represents an integer of from 0 to 4 and satisfies the relationship of $\{1 \leq (d+2e+f) \leq 4\}$; and g represents an integer of from 1 to 5.

Also, specific examples of the compound represented by the foregoing formula (1) include compounds represented by the following formulae (1-1) to (1-6), namely β-citronellol represented by the formula (1-1), nerol represented by the formula (1-2), dihydrolinalool represented by the formula (1-3), linalool represented by the formula (1-4), 6-nonen-1-ol represented by the formula (1-5) and 5-octen-1-ol represented by the formula (1-6).

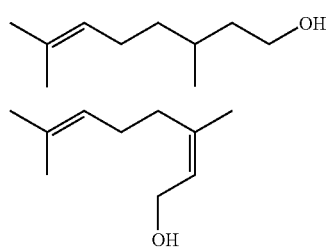
(1-1)

(1-2)

(1-3)
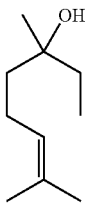

(1-4)
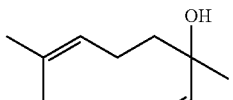

(1-5)
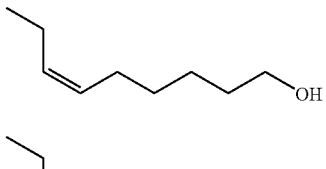

(1-6)
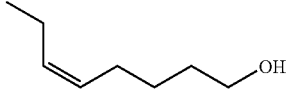

Specific examples of the compound represented by the foregoing formula (2) include compounds represented by the following formulae (2-1) to (2-7), namely (3,7-dimethyl-6-octenyloxy)-trimethyl-silane represented by the formula (2-1), (3,7-dimethyl-2,6-octadienyloxy)-trimethyl-silane represented by the formula (2-2), (1-ethyl-1,5-dimethyl-4-hexenyloxy)-trimethyl-silane represented by the formula (2-3), (1,5-dimethyl-1-vinyl-4-hexenyloxy)-trimethyl-silane represented by the formula (2-4), tert-butyl-dimethyl-6-nonenyloxy-silane represented by the formula (2-5), triisopropyl-6-noneyloxy-silane represented by the formula (2-6) and tert-butyl-(5-octenyloxy-diphenyl-methyl)-silane represented by the formula (2-7).

(2-1)
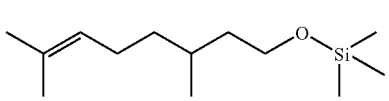

(2-2)
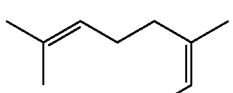

(2-3)
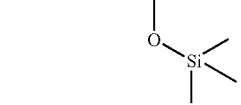
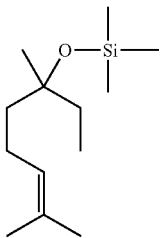

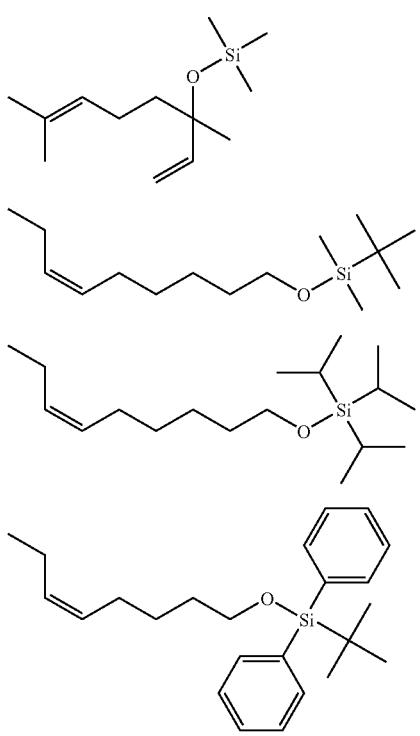

(2-4)
(2-5)
(2-6)
(2-7)

Specific examples of the compound represented by the foregoing formula (3) include compounds represented by the following formulae (3-1) to (3-3), namely 8-(2-methoxy-ethoxymethoxy)-2,6-dimethyl-2-octene represented by the formula (3-1), 1-(2-methoxy-ethoxymethoxy)-3,7-dimethyl-2,6-octadiene represented by the formula (3-2) and trimethyl-(2-(5-octenyloxymethoxy)-ethyl)-silane represented by the formula (3-3).

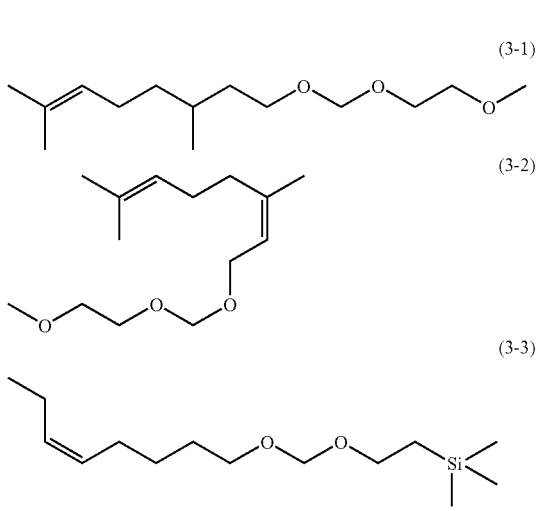

(3-1)
(3-2)
(3-3)

Specific examples of the compound represented by the foregoing formula (4) include compounds represented by the following formulae (4-1) to (4-7), namely citronellyl acetate represented by the formula (4-1), neryl acetate represented by the formula (4-2), dihydrolinalyl acetate represented by the formula (4-3), linalyl acetate represented by the formula (4-4), cis-6-nonenyl acetate represented by the formula (4-5), cis-6-nonenyl pivalate represented by the formula (4-6) and cis-5-octenyl benzoate represented by the formula (4-7).

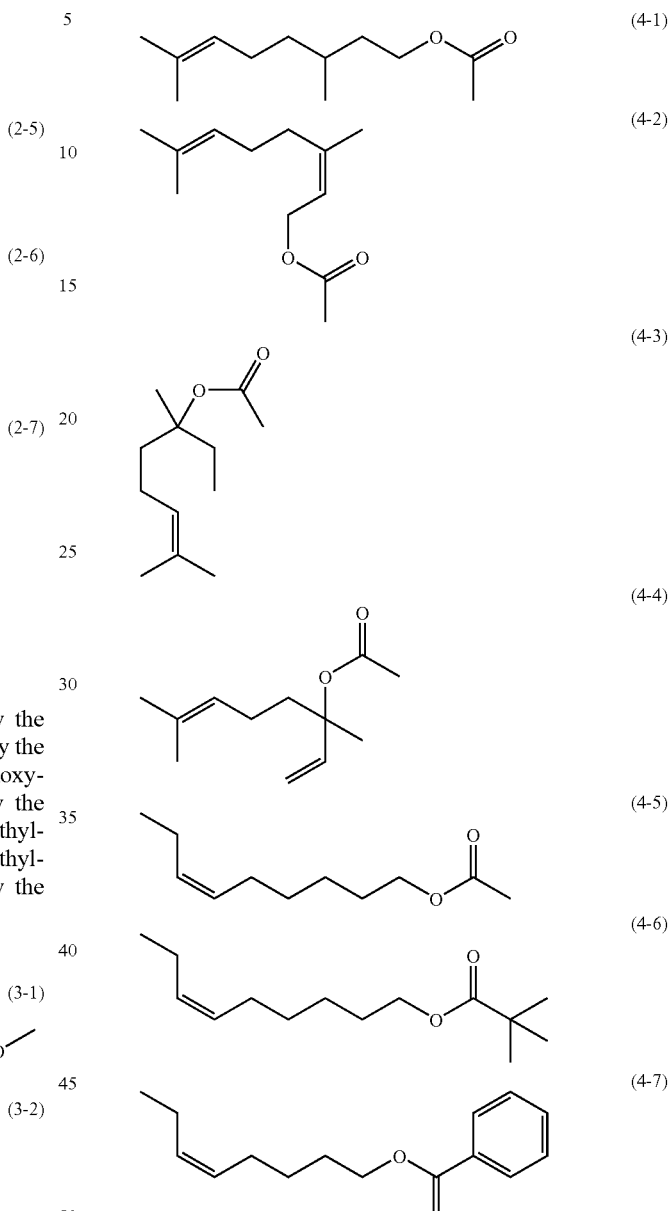

(4-1)
(4-2)
(4-3)
(4-4)
(4-5)
(4-6)
(4-7)

Specific examples of the compound represented by the foregoing formula (5) include compounds represented by the following formulae (5-1) to (5-4), namely a lithium alkoxide of β-citronellol represented by the formula (5-1), a lithium alkoxide of nerol represented by the formula (5-2), a lithium alkoxide of dihydrolinalool represented by the formula (5-3) and a lithium alkoxide of linalool represented by the formula (5-4).

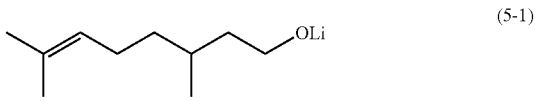

(5-1)

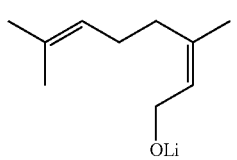
(5-2)

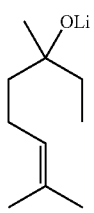
(5-3)

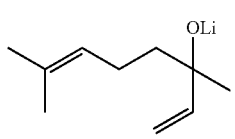
(5-4)

Specific examples of the compound represented by the foregoing formula (6) include compounds presented by the following formulae (6-1) to (6-5), namely 2-(2,6-dimethyl-5-heptenyl)-oxirane represented by the formula (6-1), 2-(2,6-dimethyl-1,5-heptadienyl)-oxirane represented by the formula (6-2), 2,3-dimethyl-2-(4-methyl-3-pentenyl)-oxirane represented by the formula (6-3), 2-methyl-3-(3-methyl-2-butenyl)-2-vinyl-oxirane represented by the formula (6-4) and 2-(3-butenyl)-oxirane represented by the formula (6-5).

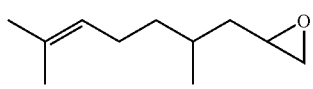
(6-1)

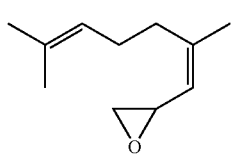
(6-2)

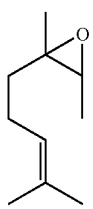
(6-3)

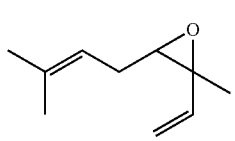
(6-4)

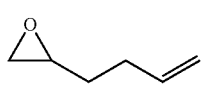
(6-5)

The chain compound having a hydroxyl group and a carbon-carbon double bond, the light metal alkoxide thereof and the derivative thereof obtained by substituting the hydroxyl group with a protective group may be used alone or in combinations with two or more kinds thereof. Above all, compounds represented by the foregoing formulae (1) to (5) wherein (a+2b+c) is equal to 4, and R1 represents a hydrogen atom and compounds represented by the foregoing formula (6) wherein (d+2e+f) is equal to 4, and R1 represents a hydrogen atom are preferably useful. Examples of such a compound include β-citronellol represented by the formula (1-1), nerol represented by the formula (1-2), (3,7-dimethyl-6-octenyloxy)-trimethyl-silane represented by the formula (2-1), (3,7-dimethyl-2,6-octadienyloxy)-trimethyl-silane represented by the formula (2-2), 8-(2-methoxy-ethoxymethoxy)-2,6-dimethyl-2-octene represented by the formula (3-1), 1-(2-methoxy-ethoxymethoxy)-3,7-dimethyl-2,6-octadiene represented by the formula (3-2), citronellyl acetate represented by the formula (4-1), neryl acetate represented by the formula (4-2), a lithium alkoxide of β-citronellol represented by the formula (5-1), a lithium alkoxide of nerol represented by the formula (5-2), 2-(2,6-dimethyl-5-heptenyl)-oxirane represented by the formula (6-1) and 2-(2,6-dimethyl-1,5-heptadienyl)-oxirane represented by the formula (6-2). By using such a compound, the decomposition efficiency at the time of overcharge becomes higher.

Though a content of the chain compound having a hydroxyl group and a carbon-carbon double bond, the light metal alkoxide thereof or the derivative thereof obtained by substituting the hydroxyl group with a protective group in the positive electrode mixture is not particularly limited, it is preferably in the range of from 0.01 to 10% by mass, and more preferably in the range of from 0.1 to 5% by mass. The range is preferable because a favorable cycle characteristic is obtainable while keeping a high energy density.

Examples of the positive electrode material capable of intercalating and deintercalating lithium include lithium complex oxides having a structure of a layered rock salt type expressed by an average composition represented by the following formula (7). This is because such a lithium complex oxide is able to enhance the energy density.

$$Li_rCo_{(1-s)}M3_sO_{(2-t)}F_u \qquad (7)$$

In the formula (7), M3 represents at least one member selected from the group consisting of nickel, manganese, magnesium, aluminum, boron, titanium, vanadium, chromium, iron, copper, zinc, molybdenum, tin, calcium, strontium and tungsten; and r, s, t and u represent values falling within the ranges of $0.8 \leq r \leq 1.2$, $0 \leq s < 0.5$, $-0.1 \leq t \leq 0.2$ and $0 \leq u \leq 0.1$, respectively. The composition of lithium varies depending upon the state of charge and discharge, and the value of r represents a value in a completely discharged state.

Specific examples of such a lithium$_{complex}$ oxide include $Li_aCoO_2$ ($a \cong 1$) and $Li_{c1}Ni_{c2}CO_{1-c2}O_2$ ($c1 \cong 1$ and $0 < c2 \leq 0.5$).

In addition to these positive electrode materials, the positive electrode material capable of intercalating and deintercalating lithium may be further mixed with other positive electrode material. Examples of such other positive electrode material include lithium-containing compounds such as other lithium oxides, lithium sulfides and other lithium-containing intercalation compounds. Examples of such a lithium-containing compound include lithium complex oxides having a structure of a layered rock salt type expressed by an average composition represented by the following formula (8) or (9); lithium complex oxides having a structure of a spinel type expressed by an average composition represented by the following formula (10); and lithium complex phosphates having a structure of an olivine type represented by the following formula (11).

$$Li_jMn_{(1-g-h)}Ni_gM1_hO_{(2-j)}F_k \qquad (8)$$

In the formula (8), M1 represents at least one member selected from the group consisting of cobalt, magnesium, aluminum, boron, titanium, vanadium, chromium, iron, copper, zinc, zirconium, molybdenum, tin, calcium, strontium and tungsten; and f, g, h, j and k represent values falling within the ranges of $0.8 \leq f \leq 1.2$, $0 < g < 0.5$, $0 \leq h \leq 0.5$, $(g+h) < 1$, $-0.1 \leq j \leq 0.2$ and $0 \leq k \leq 0.1$, respectively. The composition of lithium varies depending upon the state of charge and discharge, and the value off represents a value in a completely discharged state.

$$Li_m Ni_{(1-n)} M2_n O_{(2-p)} F_q \quad (9)$$

In the formula (9), M2 represents at least one member selected from the group consisting of cobalt, manganese, magnesium, aluminum, boron, titanium, vanadium, chromium, iron, copper, zinc, molybdenum, tin, calcium, strontium and tungsten; and m, n, p and q represent values falling within the ranges of $0.8 \leq m \leq 1.2$, $0.005 \leq n \leq 0.5$, $-0.1 \leq p \leq 0.2$ and $0 \leq q \leq 0.1$, respectively. The composition of lithium varies depending upon the state of charge and discharge, and the value of m represents a value in a completely discharged state.

$$Li_v Mn_{(2-w)} M4_w O_x F_y \quad (10)$$

In the formula (10), M4 represents at least one member selected from the group consisting of cobalt, nickel, magnesium, aluminum, boron, titanium, vanadium, chromium, iron, copper, zinc, molybdenum, tin, calcium, strontium and tungsten; and v, w, x and y represent values falling within the ranges of $0.9 \leq v - 1.1$, $0 \leq w \leq 0.6$, $3.7 \leq x \leq 4.1$ and $0 \leq y \leq 0.1$, respectively. The composition of lithium varies depending upon the state of charge and discharge, and the value of v represents a value in a completely discharged state.

$$Li_z M5 PO_4 \quad (11)$$

In the formula (11), M5 represents at least one member selected from the group consisting of cobalt, manganese, iron, nickel, magnesium, aluminum, boron, titanium, vanadium, niobium, copper, zinc, molybdenum, calcium, strontium, tungsten and zirconium; and z represents a value falling within the range of $0.9 \leq z \leq 1.1$. The composition of lithium varies depending upon the state of charge and discharge, and the value of z represents a value in a completely discharged state.

Such a lithium complex oxide may be used alone or in combinations of two or more kinds thereof.

The positive electrode material capable of intercalating and deintercalating lithium may be formed as a complex particle obtained by coating the surface of a core particle composed of any one of the lithium-containing compounds represented by the foregoing formulae (7) to (11) by a fine particle composed of any one of these lithium-containing compounds. This is because higher electrode filling properties and cycle characteristic are obtainable.

[Negative Electrode]

The negative electrode 22 has, for example, a structure in which a negative electrode active material layer 22B is provided on the both surfaces of a negative electrode collector 22A having a pair of surfaces opposing to each other. While illustration is omitted, the negative electrode active material layer 22B may be provided on only one surface of the negative electrode collector 22A. The negative electrode collector 22A is constituted of a metal foil, for example, a copper foil, etc.

The negative electrode active material layer 22B is constituted so as to contain, as a negative electrode active material, one or two or more kinds of negative electrode materials capable of intercalating and deintercalating lithium and further contain the same binder as that in the positive electrode active material layer 21B, if desired.

In this nonaqueous electrolyte secondary battery, an electrochemical equivalent of the negative electrode material capable of intercalating and deintercalating lithium is larger than an electrochemical equivalent of the positive electrode 21, and a lithium metal does not theoretically deposit on the negative electrode 22 on the way of charge.

Also, this nonaqueous electrolyte secondary battery is designed such that an open circuit voltage (namely a battery voltage) in a completely charged state falls within the range of, for example, 4.2 V or more and not more than 6.0 V. For example, in the case where the open circuit voltage in a fully charged state is 4.25 V or more, in comparison with a 4.2-V battery, since even when the same positive electrode active material is concerned, a deintercalation amount of lithium per unit mass is large, the amounts of the positive electrode material and the negative electrode material are regulated in response thereto, and a high energy density is obtainable.

Examples of the negative electrode material capable of intercalating and deintercalating lithium include carbon materials such as hardly graphitized carbon, easily graphitized carbon, graphite, pyrolytic carbons, cokes, vitreous carbons, organic polymer compound burned materials, carbon fibers and active carbon. Of these, examples of the cokes include pitch coke, needle coke and petroleum coke. The organic polymer compound burned material as referred to herein is a material obtained through carbonization by burning a polymer material such as phenol resins and furan resins at an appropriate temperature, and a part thereof is classified into hardly graphitized carbon or easily graphitized carbon. Such a carbon material is preferable because a change in the crystal structure to be generated at the time of charge and discharge is very small, a high charge and discharge capacity is obtainable, and a favorable cycle characteristic is obtainable. In particular, graphite is preferable because its electrochemical equivalent is large, and a high energy density is obtainable. Also, hardly graphitized carbon is preferable because an excellent cycle characteristic is obtainable. Moreover, a material having a low charge and discharge potential, specifically one having a charge and discharge potential close to a lithium metal, is preferable because it is easy to realize a high energy density of the battery.

Examples of the negative electrode material capable of intercalating and deintercalating lithium further include a material capable of intercalating and deintercalating lithium and containing, as a constituent element, at least one of a metal element and a semi-metal element. This is because by using such a material, a high energy density is obtainable. In particular, the joint use of such a material with the carbon material is more preferable because not only a high energy density is obtainable, but an excellent cycle characteristic is obtainable. This negative electrode material may be a simple substance, an alloy or a compound of a metal element or a semi-metal element. Also, the negative electrode material may be an electrode material having one or two or more kinds of such a phase in at least a part thereof. In an embodiment, the alloy includes alloys containing at least one metal element and at least one semi-metal element in addition to alloys composed of two or more metal elements. Also, the negative electrode material may contain a non-metal element. Examples of its texture include a solid solution, a eutectic (eutectic mixture), an intermetallic compound and one in which two or more thereof coexist.

Examples of the metal element or semi-metal element which constitutes this negative electrode material include magnesium, boron, aluminum, gallium (Ga), indium (In), silicon (Si), germanium (Ge), tin, lead (Pb), bismuth (Bi), cadmium (Cd), silver (Ag), zinc, hafnium (Hf), zirconium, yttrium (Y), palladium (Pd) and platinum (Pt). These may be crystalline or amorphous.

Of these, ones containing, as a constituent element, a metal element or a semi-metal element belonging to the Group 4B in the short form of the periodic table are preferable, and ones containing, as a constituent element, at least one of silicon and tin are especially preferable as the negative electrode material. This is because silicon and tin have large capability of intercalating and deintercalating lithium, and a high energy density is obtainable.

Examples of alloys of tin include alloys containing, as a second constituent element other than tin, at least one member selected from the group consisting of silicon, nickel, copper, iron, cobalt, manganese, zinc, indium, silver, titanium (Ti), germanium, bismuth, antimony (Sb) and chromium. Examples of alloys of silicon include alloys containing, as a second constituent element other than silicon, at least one member selected from the group consisting of tin, nickel, copper, iron, cobalt, manganese, zinc, indium, silver, titanium, germanium, bismuth, antimony and chromium.

Examples of compounds of tin or compounds of silicon include compounds containing oxygen (O) or carbon (C), and these compounds may contain the foregoing second constituent element in addition to tin or silicon.

Of these, CoSnC-containing materials containing tin, cobalt and carbon as constituent elements and having a content of carbon of 9.9% by mass or more and not more than 29.7% by mass and a proportion of cobalt of 30% by mass or more and not more than 70% by mass relative to the total sum of tin and cobalt are preferable as the negative electrode material. This is because in the foregoing composition range, not only a high energy density is obtainable, but an excellent cycle characteristic is obtainable.

This CoSnC-containing material may further contain other constituent element, if desired. As such other constituent element, silicon, iron, nickel, chromium, indium, niobium (Nb), germanium, titanium, molybdenum (Mo), aluminum, phosphorus (P), gallium (Ga) and bismuth are preferable, and two or more kinds of these elements may be incorporated. This is because the capacity or cycle characteristic can be more enhanced.

This CoSnC-containing material has a phase containing tin, cobalt and carbon, and it is preferable that this phase has a low crystalline or amorphous structure. Also, in this CoSnC-containing material, it is preferable that at least a part of carbon as the constituent element is bound to the metal element or semi-metal element as other constituent element. This is because though it may be considered that a lowering of the cycle characteristic is caused due to aggregation or crystallization of tin or the like, when carbon is bound to other element, such aggregation or crystallization can be suppressed.

Examples of a measurement method for examining the binding state of elements include X-ray photoelectron spectroscopy (XPS). In the XPS, so far as graphite is concerned, a peak of the 1s orbit (C1s) of carbon appears at 284.5 eV in an energy-calibrated device such that a peak of the 4f orbit of a gold atom (Au4f) is obtained at 84.0 eV. Also, so far as surface contamination carbon is concerned, a peak of the 1s orbit (C1s) of carbon appears at 284.8 eV. On the contrary, in the case where a charge density of the carbon element is high, for example, in the case where carbon is bound to the metal element or semi-metal element, the peak of C1s appears in a lower region than 284.5 eV. That is, in the case where a peak of a combined wave of C1s obtained regarding the CoSnC-containing material appears in a lower region than 284.5 eV, at least a part of carbon contained in the CoSnC-containing material is bound to the metal element or semi-metal element as other constituent element.

In the XPS measurement, for example, the peak of C1s is used for correcting the energy axis of a spectrum. In general, since surface contamination carbon exists on the surface, the peak of C1s of the surface contamination carbon is fixed at 284.8 eV, and this peak is used as an energy reference. In the XPS measurement, since a waveform of the peak of C1s is obtained as a form including the peak of the surface contamination carbon and the peak of carbon in the CoSnC-containing material, the peak of the surface contamination carbon and the peak of the carbon in the CoSnC-containing material are separated by means of analysis using, for example, a commercially available software. In the analysis of the waveform, the position of a main peak existing on the side of a lowest binding energy is used as an energy reference (284.8 eV).

The negative electrode active material layer 22B may further contain other negative electrode active material. Also, the negative electrode active material layer 22B may contain other material which does not contribute to the charge, such as a conductive agent, a binder and a viscosity modifier. Examples of other negative electrode active material include carbon materials such as natural graphite, artificial graphite, hardly graphitized carbon and easily graphitized carbon. Examples of the conductive agent include a graphite fiber, a metal fiber and a metal powder. Examples of the binder include fluorine based polymer compounds such as polyvinylidene fluoride; and synthetic rubbers such as a styrene-butadiene rubber and an ethylene-propylene-diene rubber. Examples of the viscosity modifier include carboxymethyl cellulose.

Furthermore, a porous insulating layer containing an insulating metal oxide may be disposed on the negative electrode active material layer 22B. It is preferable that the porous insulating layer contains an insulating metal oxide and a binder.

Examples of the insulating metal oxide include alumina, silica, magnesia, titania and zirconia. These materials may be used alone or in combinations of two or more kinds thereof.

Though the binder may be any of a thermoplastic resin or a thermosetting resin, a thermoplastic resin is preferable. Examples of the thermoplastic resin which can be used as the binder include polyvinylidene fluoride (PVdF), polytetrafluoroethylene (PTFE), polyacrylonitrile (PAN), a styrene-butadiene rubber (SBR) and carboxymethyl cellulose (CMC). These materials may be used alone or in combinations of two or more kinds thereof

[Separator]

The separator 23 partitions the positive electrode 21 and the negative electrode 22 from each other and allows a lithium ion to pass therethrough while preventing a short circuit of the current to be caused due to the contact of the both electrodes. The separator 23 is constituted of, for example, a porous film made of a synthetic resin such as polyethylene, polypropylene, polyvinylidene fluoride, polytetrafluoroethylene, aramid, polyimide, polyamide-imide and polyacrylonitrile; or a porous film made of a ceramic represented by metal oxides such as $Al_2O_3$ and $SiO_2$. The separator 23 can be formed in a single-layered structure composed of polyethylene or a multi-layered structure of two layers or three layers and containing polyethylene and other material. A mixture of several kinds among polyethylene, polypropylene and polytetrafluoroethylene may be used as a porous film; polyvinylidene fluoride, aramid, polyimide, polyamide-imide, polyacrylonitrile, $Al_2O_3$ or $SiO_2$ may be coated on the surface of a porous film made of polyethylene, polypropylene or polytetrafluoroethylene; or a multi-layered structure of two layers or three layers may be formed by laminating two or more kinds of porous films made of polyethylene, polypropylene, polyvinylidene fluoride, polytetrafluoroethylene, aramid, polyimide, polyamide-imide or polyacrylonitrile. A porous film made of a polyolefin is preferable because it is excellent in an effect for preventing a short circuit from occurring and is able to contrive to enhance the safety of a battery due to a shutdown effect.

Nonaqueous Electrolytic Solution

Also, the separator 23 is impregnated with a nonaqueous electrolytic solution (hereinafter also referred to simply as "electrolytic solution") which is a liquid electrolyte. This electrolytic solution contains a nonaqueous solvent and an electrolyte salt dissolved in this solvent.

Examples of the electrolyte salt include $LiPF_6$, $LiBF_4$, $LiAsF_6$, $LiClO_4$, $LiB(C_6H_5)_4$, $LiCH_3SO_3$, $LiCF_3SO_3$, $LiN(SO_2F)_2$, $LiN(SO_2CF_3)_2$, $LiN(SO_2C_2F_5)_2$, $LiN(SO_2C_3F_7)_2$, $LiN(SO_2C_4F_9)_2$, $LiN(SO_2CF_3)(SO_2C_2F_5)$, $LiN(SO_2CF_3)(SO_2C_3F_7)$, $LiN(SO_2CF_3)(SO_2C_4F_9)$, $LiN(SO_2C_2F_5)(SO_2C_3F_7)$, $LiN(SO_2C_2F_5)(SO_2C_4F_9)$, $LiN(SO_2C_3F_7)(SO_2C_4F_9)$, $LiC(SO_2CF_3)_3$, $LiAlCl_4$, $LiSiF_6$, $LiCl$, lithium difluoro[oxolato-O,O']borate, lithium bisoxalatoborate, lithium monofluorophosphate, lithium difluorophosphate and LiBr.

In addition to these electrolyte salts, electrolyte salts represented by the following formulae (12) to (14) are also useful.

$$LiPF_a(C_nF_{2n+1})_x \qquad (12)$$

In the formula (12), a represents an integer of from 0 to 5; n represents an integer of from 1 to 6; and x represents an integer which satisfies the relationship of (a+x)=6, provided that x is not 0.

$$LiBF_b(C_nF_{2n+1})_y \qquad (13)$$

In the formula (13), b represents an integer of from 0 to 3; n represents an integer of from 1 to 6; and y represents an integer which satisfies the relationship of (b+y)=4, provided that y is not 0.

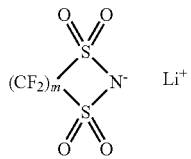

(14)

In the formula (14), m represents an integer of either 2 or 3.

Specific examples of the electrolyte salt represented by the foregoing formula (12) include lithium salts represented by $LiPF_3(CF_3)_3$, $LiPF_3(C_2F_5)_3$, $LiPF_3(C_3F_7)_3$, $LiPF_3(C_4F_9)_3$, $LiPF_4(CF_3)_2$, $LiPF_4(C_2F_5)_2$, $LiPF_4(C_3F_7)_2$ and $LiPF_4(C_4F_9)_2$. In the foregoing expression of compounds, the fluoroalkyl groups represented by $C_3F_7$ and $C_4F_9$ may be any of a linear structure or a branched structure. Besides, there are similarly exemplified lithium salts represented by $LiP(C_oF_{2o+1})_6$, $LiPF(C_oF_{2o+1})_5$, $LiPF_2(C_oF_{2o+1})_4$ and $LiPF_5(C_oF_{2o+1})$ wherein o represents an integer other than 0.

Specific examples of the electrolyte salt represented by the foregoing formula (13) include lithium salts represented by $LiBF_3(CF_3)$, $LiBF_3(C_2F_5)$, $LiBF_3(C_3F_7)$, $LiBF_2(C_2F_5)_2$ and $LiB(CF_3)_4$. Besides, there are similarly exemplified lithium salts represented by $LiBF(C_oF_{2o+1})_3$ wherein o represents an integer other than 0.

These electrolyte salts may be used alone or in admixture of two or more kinds thereof. In an embodiment, from the viewpoints that high ionic conductivity is obtainable and that favorable chemical stability is imparted, it is preferable to use an electrolyte salt containing $LiPF_6$ or $LiPF_3(C_2F_5)_3$ or the like.

A concentration of the electrolyte salt in the nonaqueous electrolytic solution is preferably in the range of 0.1 moles/kg or more and not more than 2.0 moles/kg. This is because the ionic conductivity can be more enhanced within this range.

As the nonaqueous solvent which is used in the electrolytic solution, for example, a cyclic carbonate which is a high-dielectric solvent having a dielectric constant of 30 or more, such as ethylene carbonate and propylene carbonate, can be used. These carbonates can be used alone or in admixture of two or more kinds thereof. Also, it is especially preferable that the nonaqueous solvent includes a halogen atom-containing cyclic carbonate derivative. This is because a minute coating film is formed on the negative electrode, thereby suppressing any further reductive decomposition, and therefore, a favorable cycle characteristic is obtainable.

Specific examples of the halogen atom-containing cyclic carbonate include 4-fluoro-1,3-dioxolan-2-one (FEC), 4,5-difluoro-1,3-dioxolan-2-one DFEC), 4-chloro-1,3-dioxolan-2-one, 4-trifluoromethyl-1,3-dioxolan-2-one and 4-fluoro-5-methyl-1,3-dioxolan-2-one. From the viewpoint of forming a more minute and stable coating film on the negative electrode, it is preferable to use 4-fluoro-1,3-dioxolan-2-one (FEC) or 4,5-dilfluoro-1,3-dioxolan-2-one (DFEC).

A content of the halogen atom-containing cyclic carbonate in the nonaqueous electrolytic solution is preferably in the range of 0.01% by mass or more and not more than 30% by mass, and more preferably in the range of 2% by mass or more and not more than 20% by mass. When the content of the halogen atom-containing cyclic carbonate falls within the foregoing range, a more excellent cycle characteristic is obtainable.

In addition to the cyclic carbonate which is a high-dielectric solvent, it is preferable that the nonaqueous solvent is mixed with a chain carbonate which is a low-viscosity solvent having a viscosity of not more than 1 mPa·s, such as diethyl carbonate, dimethyl carbonate, ethyl methyl carbonate and methyl propyl carbonate, and used. This is because higher ionic conductivity is obtainable. The low-viscosity solvent may be used alone or in admixture of two or more kinds thereof.

Besides, butylene carbonate, vinylene carbonate, γ-butyrolactone, γ-valerolactone, 1,2-dimethoxyethane, tetrahydrofuran, 2-methyltetrahydrofuran, trimethyl orthoformate, triethyl orthoformate, tripropyl orthoformate, 1,3-dioxolane, 4-methyl-1,3-dioxolane, methyl acetate, methyl propionate, acetonitrile, succinonitrile, glutaronitrile, adiponitrile, methoxyacetonitrile, 3-methoxypropionitirle, N,N-dimethylformamide, N-methylpyrrolidinone, N-methyloxazolidinone, N,N-dimethylimidazolidinone, nitromethane, nitroethane, sulfolane, fluorobenzene, dimethyl sulfoxide and trimethyl phosphate are also useful as the nonaqueous solvent.

In an embodiment, it is preferable that the nonaqueous electrolytic solution contains at least one compound selected from the group consisting of a chain compound having a hydroxyl group and a carbon-carbon double bond, a light metal alkoxide thereof and a derivative thereof obtained by substituting the hydroxyl group with a protective group. By incorporating such a compound into the nonaqueous electrolytic solution, a high-energy density battery having a favorable cycle characteristic as well as excellent high-temperature storage characteristic and overcharge safety can be realized.

Examples of the chain compound having a hydroxyl group and a carbon-carbon double bond, the light metal alkoxide thereof and the derivative thereof obtained by substituting the hydroxyl group with a protective group include compounds represented by the following formulae (1) to (6).

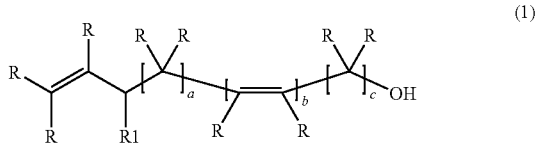

(1)

In the formula (1), each of R and R1 represents a hydrogen atom, a halogen atom, a vinyl group, an alkyl group having from 1 to 4 carbon atoms or a halogenated alkyl group having from 1 to 4 carbon atoms in which at least one hydrogen atom is substituted with a halogen atom, and R and R1 may be the same as or different from each other; and each of a, b and c represents an integer of from 0 to 5 and satisfies the relationship of $\{1 \leq (a+2b+c) \leq 5\}$.

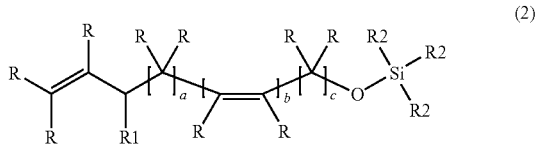

(2)

In the formula (2), each of R and R1 represents a hydrogen atom, a halogen atom, a vinyl group, an alkyl group having from 1 to 4 carbon atoms or a halogenated alkyl group having from 1 to 4 carbon atoms in which at least one hydrogen atom is substituted with a halogen atom, and R and R1 may be the same as or different from each other; R2 represents a methyl group, an ethyl group, an isopropyl group, a tertiary butyl group or a phenyl group, and each R2 may be the same as or different from every other R2; and each of a, b and c represents an integer of from 0 to 5 and satisfies the relationship of $\{1 \leq (a+2b+c) \leq 5\}$.

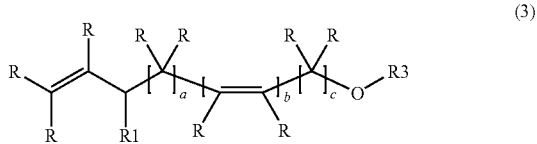

(3)

In the formula (3), each of R and R1 represents a hydrogen atom, a halogen atom, a vinyl group, an alkyl group having from 1 to 4 carbon atoms or a halogenated alkyl group having from 1 to 4 carbon atoms in which at least one hydrogen atom is substituted with a halogen atom, and R and R1 may be the same as or different from each other; R3 represents a hydrocarbon group having from 1 to 10 carbon atoms or a hydrocarbon group having from 1 to 10 carbon atoms, a part of which is substituted with a functional group containing a hetero element inclusive of oxygen (O) or silicon (Si); and each of a, b and c represents an integer of from 0 to 5 and satisfies the relationship of $\{1 \leq (a+2b+c) \leq 5\}$.

Examples of the hydrocarbon group include an alkyl group and an aryl group each having from 1 to 10 carbon atoms, for example, a methyl group, a tertiary butyl group, a benzyl group, etc. Examples of the hydrocarbon group containing oxygen (O) include a methoxymethyl group, a 2-tetrahydropyranyl group, a 1-ethoxyethyl group, a 1-methyl-1-methoxyethyl group, a 2-methoxyethoxymethyl group and a p-methoxybenzyl group. Examples of the hydrocarbon group containing oxygen (O) and silicon (Si) include a 2-(trimethylsilyl)ethoxymethyl group.

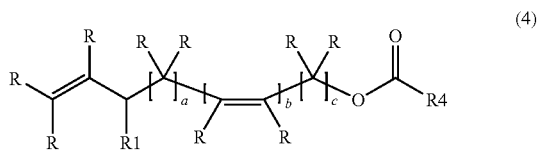

(4)

In the formula (4), each of R and R1 represents a hydrogen atom, a halogen atom, a vinyl group, an alkyl group having from 1 to 4 carbon atoms or a halogenated alkyl group having from 1 to 4 carbon atoms in which at least one hydrogen atom is substituted with a halogen atom, and R and R1 may be the same as or different from each other; R4 represents a methyl group, a tertiary butyl group or an aryl group; and each of a, b and c represents an integer of from 0 to 5 and satisfies the relationship of $\{1 \leq (a+2b+c) \leq 5\}$.

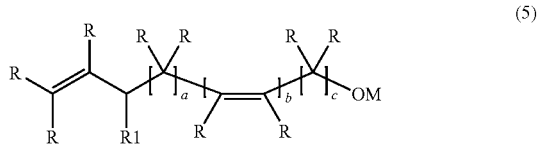

(5)

In the formula (5), each of R and R1 represents a hydrogen atom, a halogen atom, a vinyl group, an alkyl group having from 1 to 4 carbon atoms or a halogenated alkyl group having from 1 to 4 carbon atoms in which at least one hydrogen atom is substituted with a halogen atom, and R and R1 may be the same as or different from each other; M represents an alkali metal element; and each of a, b and c represents an integer of from 0 to 5 and satisfies the relationship of $\{1 \leq (a+2b+c) \leq 5\}$.

Examples of the alkali metal element include potassium (K), lithium (Li) and sodium (Na).

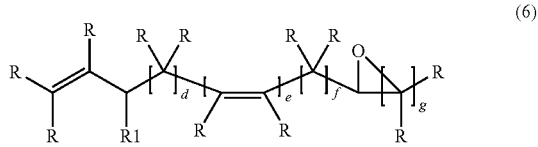

(6)

In the formula (6), each of R and R1 represents a hydrogen atom, a halogen atom, a vinyl group, an alkyl group having from 1 to 4 carbon atoms or a halogenated alkyl group having from 1 to 4 carbon atoms in which at least one hydrogen atom is substituted with a halogen atom, and R and R1 may be the same as or different from each other; each of d, e and f represents an integer of from 0 to 4 and satisfies the relationship of $\{1 \leq (d+2e+f) \leq 4\}$; and g represents an integer of from 1 to 5.

Also, specific examples of the compound represented by the foregoing formula (1) include compounds represented by the following formulae (1-1) to (1-6), namely β-citronellol represented by the formula (1-1), nerol represented by the formula (1-2), dihydrolinalool represented by the formula (1-3), linalool represented by the formula (1-4), 6-nonen-1-ol represented by the formula (1-5) and 5-octen-1-ol represented by the formula (1-6).

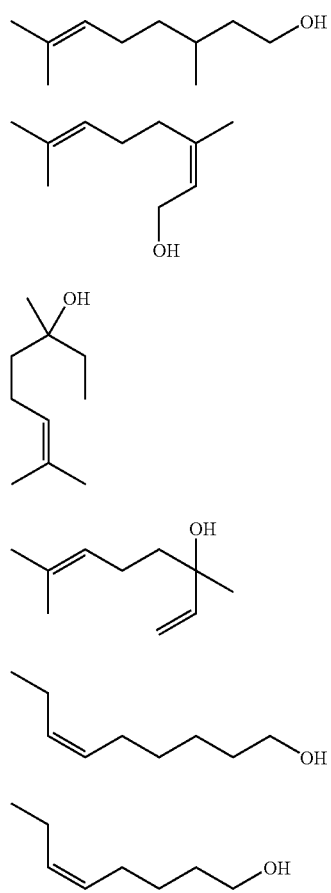

Specific examples of the compound represented by the foregoing formula (2) include compounds represented by the following formulae (2-1) to (2-7), namely (3,7-dimethyl-6-octenyloxy)-trimethyl-silane represented by the formula (2-1), (3,7-dimethyl-2,6-octadienyloxy)-trimethyl-silane represented by the formula (2-2), (1-ethyl-1,5-dimethyl-4-hexenyloxy)-trimethyl-silane represented by the formula (2-3), (1,5-dimethyl-1-vinyl-4-hexenyloxy)-trimethyl-silane represented by the formula (2-4), tert-butyl-dimethyl-6-nonenyloxy-silane represented by the formula (2-5), triisopropyl-6-noneyloxy-silane represented by the formula (2-6) and tert-butyl-(5-octenyloxy-diphenyl-methyl)-silane represented by the formula (2-7).

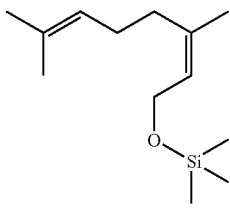
(2-2)

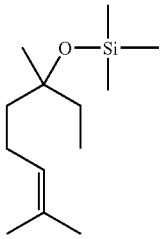
(2-3)

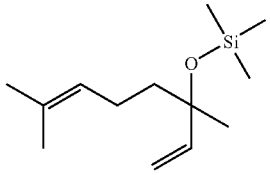
(2-4)

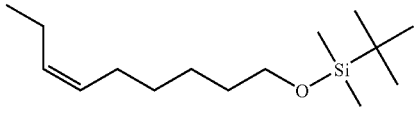
(2-5)

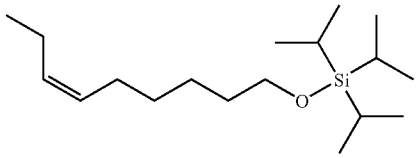
(2-6)

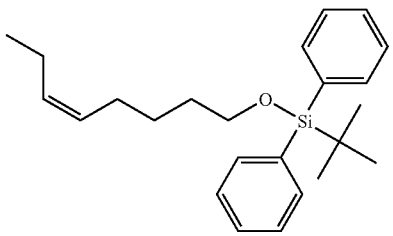
(2-7)

Specific examples of the compound represented by the foregoing formula (3) include compounds represented by the following formulae (3-1) to (3-3), namely 8-(2-methoxy-ethoxymethoxy)-2,6-dimethyl-2-octene represented by the formula (3-1), 1-(2-methoxy-ethoxymethoxy)-3,7-dimethyl-2,6-octadiene represented by the formula (3-2) and trimethyl-(2-(5-octenyloxymethoxy)-ethyl)-silane represented by the formula (3-3).

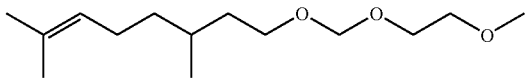
(3-1)

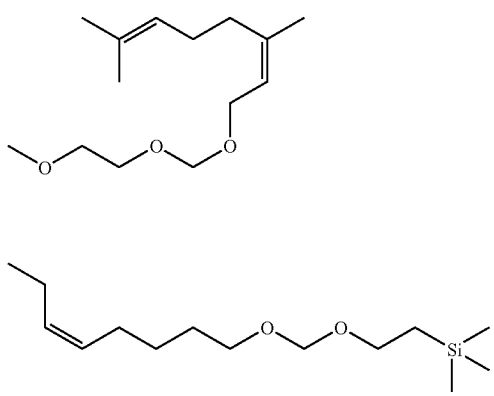
(3-2)

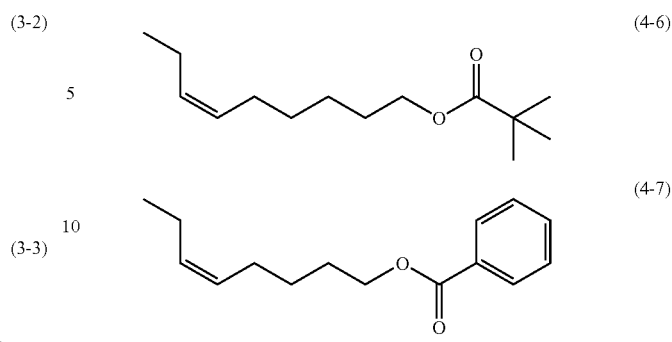
(4-6)

(4-7)

(3-3)

Specific examples of the compound represented by the foregoing formula (4) include compounds represented by the following formulae (4-1) to (4-7), namely citronellyl acetate represented by the formula (4-1), neryl acetate represented by the formula (4-2), dihydrolinalyl acetate represented by the formula (4-3), linalyl acetate represented by the formula (4-4), cis-6-nonenyl acetate represented by the formula (4-5), cis-6-nonenyl pivalate represented by the formula (4-6) and cis-5-octenyl benzoate represented by the formula (4-7).

Specific examples of the compound represented by the foregoing formula (5) include compounds represented by the following formulae (5-1) to (5-4), namely a lithium alkoxide of (3-citronellol represented by the formula (5-1), a lithium alkoxide of nerol represented by the formula (5-2), a lithium alkoxide of dihydrolinalool represented by the formula (5-3) and a lithium alkoxide of linalool represented by the formula (5-4).

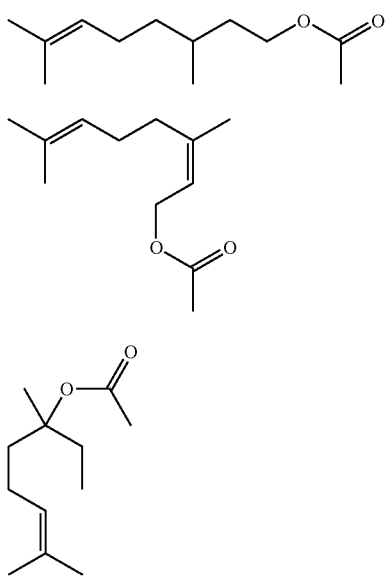
(4-1)
(4-2)
(4-3)
(4-4)
(4-5)

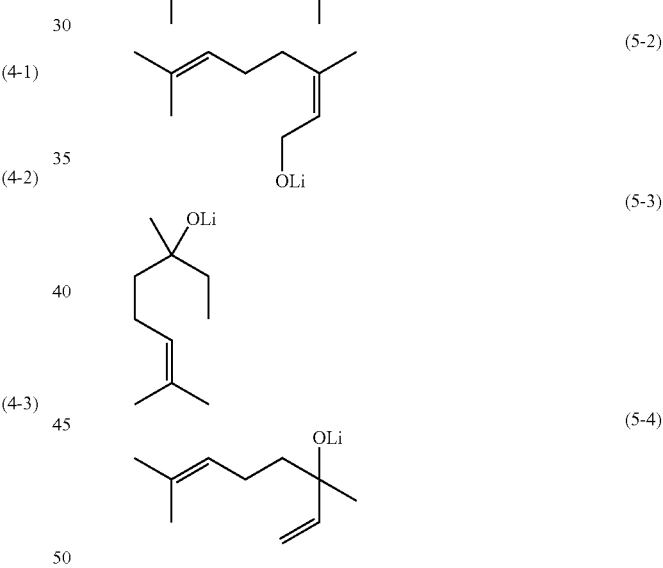
(5-1)
(5-2)
(5-3)
(5-4)

Specific examples of the compound represented by the foregoing formula (6) include compounds presented by the following formulae (6-1) to (6-5), namely 2-(2,6-dimethyl-5-heptenyl)-oxirane represented by the formula (6-1), 2-(2,6-dimethyl-1,5-heptadienyl)-oxirane represented by the formula (6-2), 2,3-dimethyl-2-(4-methyl-3-pentenyl)-oxirane represented by the formula (6-3), 2-methyl-3-(3-methyl-2-butenyl)-2-vinyl-oxirane represented by the formula (6-4) and 2-(3-butenyl)-oxirane represented by the formula (6-5).

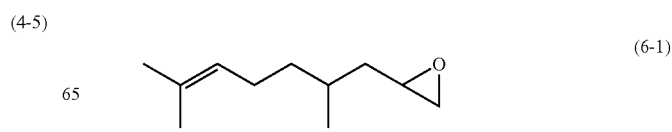
(6-1)

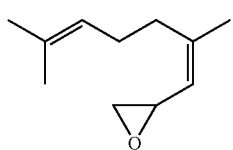

(6-2)

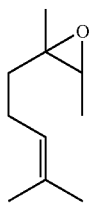

(6-3)

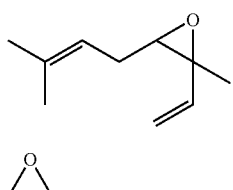

(6-4)

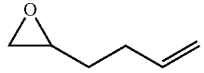

(6-5)

The chain compound having a hydroxyl group and a carbon-carbon double bond, the light metal alkoxide thereof and the derivative thereof obtained by substituting the hydroxyl group with a protective group may be used alone or in combinations with two or more kinds thereof. Above all, compounds represented by the foregoing formulae (1) to (5) wherein (a+2b+c) is equal to 4, and R1 represents a hydrogen atom and compounds represented by the foregoing formula (6) wherein (d+2e+f) is equal to 4, and R1 represents a hydrogen atom are preferably useful. Examples of such a compound include β-citronellol represented by the formula (1-1), nerol represented by the formula (1-2), (3,7-dimethyl-6-octenyloxy)-trimethyl-silane represented by the formula (2-1), (3,7-dimethyl-2,6-octadienyloxy)-trimethyl-silane represented by the formula (2-2), 8-(2-methoxy-ethoxymethoxy)-2,6-dimethyl-2-octene represented by the formula (3-1), 1-(2-methoxy-ethoxymethoxy)-3,7-dimethyl-2,6-octadiene represented by the formula (3-2), citronellyl acetate represented by the formula (4-1), neryl acetate represented by the formula (4-2), a lithium alkoxide of β-citronellol represented by the formula (5-1), a lithium alkoxide of nerol represented by the formula (5-2), 2-(2,6-dimethyl-5-heptenyl)-oxirane represented by the formula (6-1) and 2-(2,6-dimethyl-1,5-heptadienyl)-oxirane represented by the formula (6-2). By using such a compound, the decomposition efficiency at the time of overcharge becomes higher.

Though a content of at least one compound selected from the group consisting of a chain compound having a hydroxyl group and a carbon-carbon double bond, a light metal alkoxide thereof and a derivative thereof obtained by substituting the hydroxyl group with a protective group in the nonaqueous electrolytic solution is not particularly limited, it is preferably in the range of from 0.01 to 10% by mass, and more preferably in the range from 0.1 to 5% by mass. What the content of at least one compound selected from the group consisting of a chain compound having a hydroxyl group and a carbon-carbon double bond, a light metal alkoxide thereof and a derivative thereof obtained by substituting the hydroxyl group with a protective group falls within the foregoing range is preferable because a favorable cycle characteristic is obtainable while keeping a high energy density.

In an embodiment, a secondary battery is prepared using the foregoing nonaqueous electrolytic solution and/or positive electrode. By incorporating at least one compound selected from the group consisting of a chain compound having a hydroxyl group and a carbon-carbon double bond, a light metal alkoxide thereof and a derivative thereof obtained by substituting the hydroxyl group with a protective group into at least one of the nonaqueous electrolytic solution and the positive electrode, the decomposition efficiency at the time of overcharge becomes higher, and a nonaqueous electrolyte secondary battery having excellent cycle characteristic and high-temperature characteristic as well as overcharge safety can be formed.

Next, an example of a manufacture method of the foregoing secondary battery is described.

First of all, the positive electrode 21 is prepared. For example, at least one compound selected from the group consisting of a chain compound having a hydroxyl group and a carbon-carbon double bond, a light metal alkoxide thereof and a derivative thereof obtained by substituting the hydroxyl group with a protective group, a positive electrode active material, a conductive agent and a binder are mixed to prepare a positive electrode mixture, and this positive electrode mixture is dispersed in a solvent such as N-methyl-2-pyrrolidone to prepare a positive electrode mixture slurry in a paste state. Subsequently, this positive electrode mixture slurry is coated on the positive electrode collector 21A, and the solvent is then dried. The resultant is compression molded by a roll press or the like to form the positive electrode active material layer 21B. There is thus prepared the positive electrode 21.

Also, the negative electrode 22 is prepared. For example, a negative electrode active material and a binder are mixed to prepare a negative electrode mixture, and this negative electrode mixture is dispersed in a solvent such as N-methyl-2-pyrrolidone to prepare a negative electrode mixture slurry in a paste state. Subsequently, this negative electrode mixture slurry is coated on the negative electrode collector 22A, and the solvent is then dried. The resultant is compression molded by a roll press or the like to form the negative electrode active material layer 22B. There is thus prepared the negative electrode 22.

Subsequently, the positive electrode lead 25 is installed in the positive electrode collector 21A by means of welding or the like, and the negative electrode lead 26 is also installed in the negative electrode collector 22A by means of welding or the like. Thereafter, the positive electrode 21 and the negative electrode 22 are wound via the separator 23; a tip end of the positive electrode lead 25 is welded with the safety valve mechanism 15; and a tip end of the negative electrode lead 26 is also welded with the battery can 11. The wound positive electrode 21 and negative electrode 22 are interposed between a pair of the insulating plates 12 and 13 and housed in the inside of the battery can 11. After housing the positive electrode 21 and the negative electrode 22 in the inside of the battery can 11, an electrolytic solution is injected into the inside of the battery can 11 and impregnated in the separator 23. Thereafter, the battery lid 14, the safety valve mechanism 15 and the positive temperature coefficient device 16 are fixed to the open end of the battery can 11 upon being caulked via the gasket 17. There is thus formed the secondary battery shown in FIG. 1.

In this secondary battery, when charged, for example, a lithium ion is deintercalated from the positive electrode active material layer 21B and intercalated in the negative electrode active material layer 22B via the electrolytic solution. Also, when discharged, for example, a lithium ion is deintercalated from the negative electrode active material layer 22B and intercalated in the positive electrode active material layer 21B via the electrolytic solution.

In this way, according to the present embodiment, the gas generation occurs only under an overcharge condition, and the overcharge safety can be secured. Even in the case where the charge final voltage is increased to 4.2 V or more, since this effect endures, a high energy density can be achieved. Also, the high-temperature characteristic and cycle characteristic are improved or not affected at all.

Accordingly, a secondary battery having excellent cycle characteristic and overcharge safety and having a high capacity can be realized.

(Second Embodiment)

Figure 3:
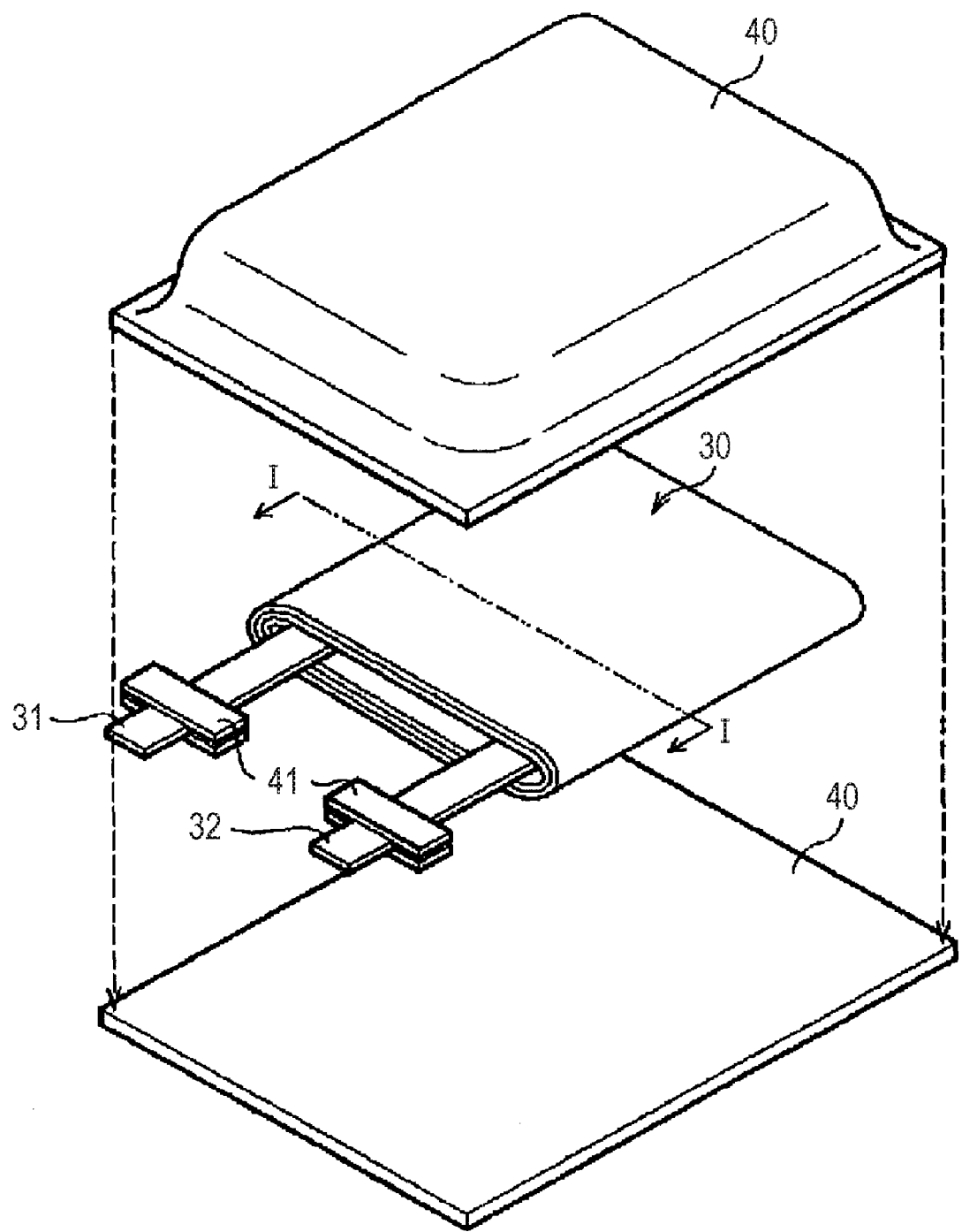
FIG. 3 is an exploded perspective view showing a configuration of a secondary battery according to a second embodiment.

FIG. 3 shows a configuration of a secondary battery according to a second embodiment according to the present invention. This secondary battery is called a laminated film type and is one in which a wound electrode body 30 having a positive electrode lead 31 and a negative electrode lead 32 installed therein is housed in the inside of an exterior member 40 in a film state.

The positive electrode lead 31 and the negative electrode lead 32 are each led out in, for example, the same direction from the inside toward the outside of the exterior member 40. The positive electrode lead 31 and the negative electrode lead 32 are each constituted of a metal material, for example, aluminum, copper, nickel, stainless steel, etc. and formed in a thin plate state or a network state.

The exterior member 40 is constituted of, for example, a rectangular aluminum laminated film obtained by sticking a nylon film, an aluminum foil and a polyethylene film in this order. In the exterior member 40, for example, the side of the polyethylene film is disposed so as to be opposing to the wound electrode body 30, and the respective outer edges thereof are allowed to adhere to each other by means of fusion or with an adhesive. A contact film 41 is inserted between the exterior member 40 and each of the positive electrode lead 31 and the negative electrode lead 32 for the purpose of preventing invasion of the outside air. The contact film 41 is constituted of a material having adhesion to each of the positive electrode lead 31 and the negative electrode lead 32, for example, polyolefin resins such as polyethylene, polypropylene, modified polyethylene and modified polypropylene.

The exterior member 40 may be constituted of a laminated film having other structure, or a polymer film such as polypropylene or a metal film in place of the foregoing aluminum laminated film.

Figure 4:
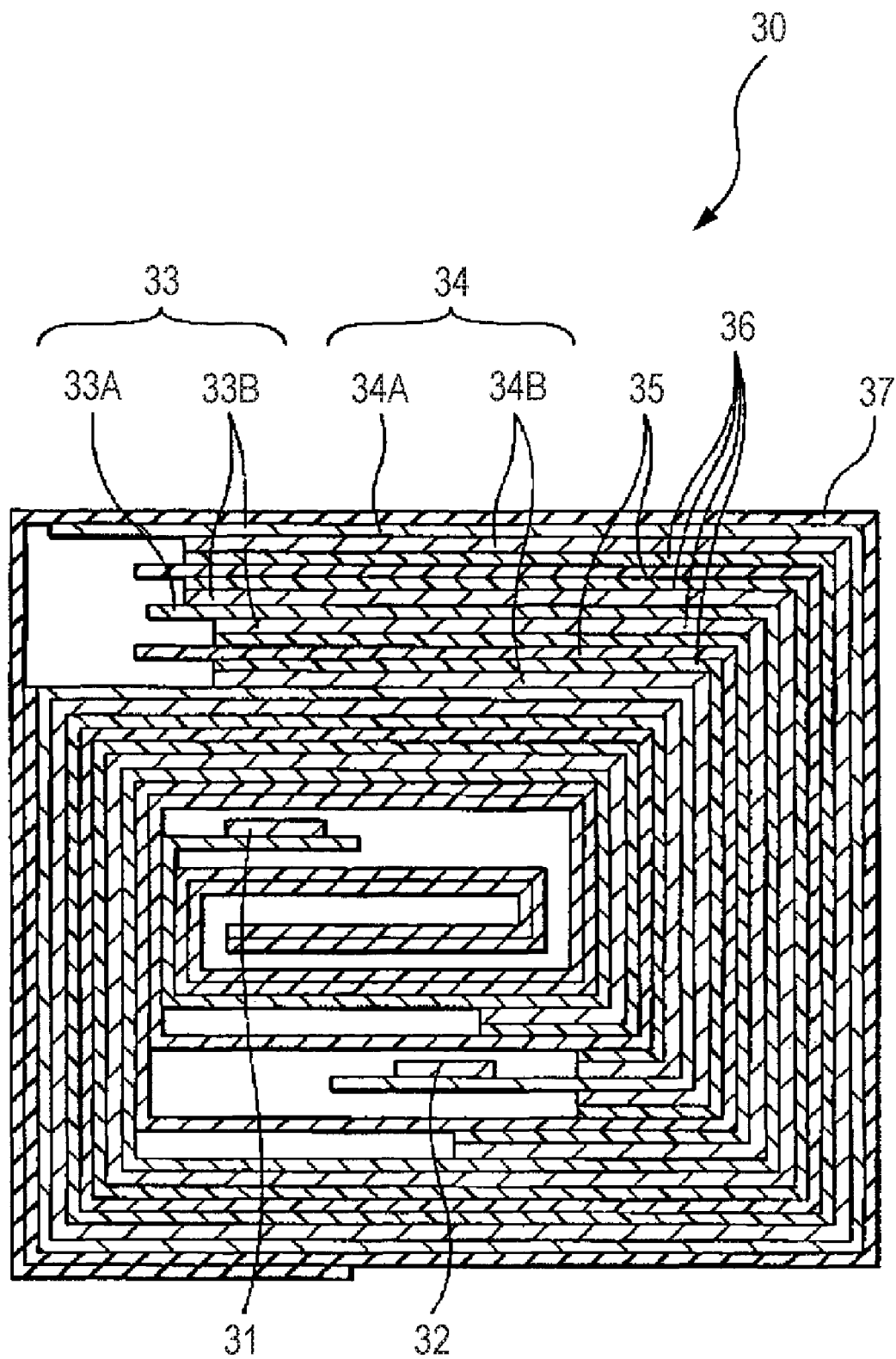
FIG. 4 is a schematic sectional view showing a configuration along a I-I line of a wound electrode body shown in FIG. 3.

FIG. 4 shows a sectional structure along a I-I line of the wound electrode body 30 shown in FIG. 3. The wound electrode body 30 is one prepared by laminating a positive electrode 33 and a negative electrode 34 via a separator 35 and an electrolyte layer 36 and winding the laminate, and an outermost peripheral part thereof is protected by a protective tape 37.

The positive electrode 33 has a structure in which a positive electrode active material layer 33B is provided on one surface or both surfaces of a positive electrode collector 33A. The negative electrode 34 has a structure in which a negative electrode active material layer 34B is provided on one surface or both surfaces of a negative electrode collector 34A, and the negative electrode active material layer 34B and the positive electrode active material layer 33B are disposed opposing to each other. The configuration of each of the positive electrode collector 33A, the positive electrode active material layer 33B, the negative electrode collector 34A, the negative electrode active material layer 34B and the separator 35 is the same as the configuration of each of the positive electrode collector 21A, the positive electrode active material layer 21B, the negative electrode collector 22A, the negative electrode active material layer 22B and the separator 23 in the foregoing first embodiment.

The electrolyte layer 36 is formed in a so-called gel state, which contains the electrolytic solution according to the present embodiment and a polymer compound serving a holding material for holding this electrolytic solution therein. The electrolyte in a gel state is preferable because not only high ionic conductivity is obtainable, but the liquid leakage of the battery can be prevented from occurring. Examples of the polymer material include ether based polymer compounds such as polyethylene oxide and a crosslinked material containing polyethylene oxide; ester based polymer compounds such as polymethacrylates; acrylate based polymer compounds; and polymers of vinylidene fluoride such as polyvinylidene fluoride and a copolymer of vinylidene fluoride and hexafluoropropylene. These compounds may be used alone or in admixture of two or more kinds thereof. In particular, from the standpoint of redox stability, it is desirable to use a fluorine based polymer compound such as polymers of vinylidene fluoride.

This secondary battery can be, for example, manufactured by the following manner.

First of all, a precursor solution containing an electrolytic solution, a polymer compound and a mixed solvent is coated on each of the positive electrode 33 and the negative electrode 34, and the mixed solvent is then vaporized to form the electrolyte layer 36. Thereafter, the positive electrode lead 31 is installed in an end of the positive electrode collector 33A by means of welding, and the negative electrode lead 32 is also installed in an end of the negative electrode collector 34A by means of welding. Subsequently, the positive electrode 33 and the negative electrode 34 each provided with the electrolyte layer 36 are laminated via the separator 35 to form a laminate, the laminate is then wound in a longitudinal direction thereof, and the protective tape 37 is allowed to adhere to the outermost peripheral part to form the wound electrode body 30. Finally, for example, the wound electrode body 30 is interposed between the exterior members 40, and the outer edges of the exterior members 40 are allowed to adhere to each other by means of heat fusion or the like, thereby sealing the wound electrode body 30. On that occasion, the contact film 41 is inserted between each of the positive electrode lead 31 and the negative electrode lead 32 and the exterior member 40. According to this, the secondary battery shown in FIGS. 3 and 4 is completed.

Also, this secondary battery may be prepared in the following manner. First of all, the positive electrode 33 and the negative electrode 34 are prepared in the foregoing manner; the positive electrode lead 31 and the negative electrode lead 32 are installed in the positive electrode 33 and the negative electrode 34, respectively; the positive electrode 33 and the negative electrode 34 are then laminated via the separator 35 and wound; and the protective tape 37 is allowed to adhere to the outermost peripheral part to form a wound body which is a precursor of the wound electrode body 30. Subsequently, this wound body is interposed between the exterior members 40, and the outer edges exclusive of one side are allowed to adhere to each other by means of heat fusion to form a bag and then housed in the inside of the exterior member 40. Subsequently, a composition for electrolyte containing an electrolytic solution, a monomer which is a raw material of the polymer compound, a polymerization initiator and optionally other materials such as a polymerization inhibitor is prepared and injected into the inside of the exterior member 40.

After injecting the composition for electrolyte, an opening of the exterior member 40 is hermetically sealed by means of heat fusion in a vacuum atmosphere. Subsequently, the monomer is polymerized upon heating to form a polymer compound, thereby forming the electrolyte layer 36 in a gel state. There is thus assembled the secondary battery shown in FIGS. 3 and 4.

The actions and effects of this secondary battery are the same as those in the foregoing first embodiment.

EXAMPLES

Specific working examples of the present invention are hereunder described in detail, but it should not be construed that the present invention is limited to only these working examples.

Examples 1-1 to 1-5

The positive electrode 21 was prepared in the following manner. 94% by mass of a lithium cobalt complex oxide as a positive electrode active material, 3% by mass of ketjen black (amorphous carbon powder) as a conductive agent and 3% by mass of polyvinylidene fluoride as a binder were mixed, and the mixture was dispersed in N-methyl-2-pyrrolidone as a solvent to prepare a positive electrode mixture slurry. Subsequently, this positive electrode mixture slurry was uniformly coated on the both surfaces of the positive electrode collector 21A made of a strip-shaped aluminum foil having a thickness of 20 μm, dried and then compression molded to form the positive electrode active material layer 21B. There was thus prepared the positive electrode 21. Thereafter, the positive electrode lead 25 made of aluminum was installed in one end of the positive electrode collector 21A.

The negative electrode 22 was prepared in the following manner. First of all, 90% by weight of a graphite powder as a negative electrode active material and 10% by weight of polyvinylidene fluoride (PVdF) as a binder were mixed to prepare a negative electrode mixture. This negative electrode mixture was dispersed in N-methyl-2-pyrrolidone (NMP) to prepare a negative electrode mixture slurry; and the negative electrode mixture slurry was then uniformly coated on the both surfaces of the negative electrode collector 22A made of a strip-shaped copper foil having a thickness of 15 μm and further compression molded to form the negative electrode active material layer 22B. On that occasion, the amount of the positive electrode active material and the amount of the negative electrode active material were regulated to design an open circuit voltage (namely a battery voltage) at the time of complete charge as shown in Table 1. Thereafter, the negative electrode lead 26 made of nickel was installed in one end of the negative electrode collector 22A.

Subsequently, ethylene carbonate (EC), propylene carbonate (PC), dimethyl carbonate (DMC), ethyl methyl carbonate (EMC) and 4-fluoro-1,3-dioxolan-2-one (FEC) were mixed as a solvent in a mass ratio of EC/PC/DMC/EMC/FEC of 20/5/58/5/10; 2% by mass of citronellyl acetate was dissolved therein; and lithium hexafluorophosphate ($LiPF_6$) as an electrolyte salt was further dissolved therein, thereby preparing a nonaqueous electrolytic solution. On that occasion, a concentration of $LiPF_6$ in the electrolytic solution was regulated to be 1.2 mol/kg.

Subsequently, the separator 23 made of a microporous film was prepared; the negative electrode 22, the separator 23, the positive electrode 21 and the separator 23 were laminated in this order; and the laminate was helically wound many times, thereby preparing the wound electrode body 20 of a jelly roll type having an outer diameter of 17.5 mm. On that occasion, a polyethylene (PE) separator having a thickness of 16 μm was used as the separator 23.

After preparing the wound electrode body 20, the wound electrode body 20 was interposed between a pair of the insulating plates 12 and 13; not only the negative electrode lead 26 was welded with the battery can 11, but the positive electrode lead 25 was welded with the safety valve mechanism 15; and the wound electrode body 20 was then housed in the inside of the battery can 11 made of nickel-plated iron. Subsequently, the electrolytic solution was injected into the inside of the battery can 11 in a reduced pressure mode.

Thereafter, the battery lid 14 was caulked with the battery can 11 via the gasket 17, thereby preparing a secondary battery of a cylinder type having a diameter of 18 mm and a height of 65 mm.

Example 1-6

A secondary battery was prepared in the same manner as in Example 1-3, except that at the time of preparing a positive electrode, 2% by mass of citronellyl acetate was added to the positive electrode mixture slurry, but the citronellyl acetate was not added to the electrolytic solution.

Example 1-7

A secondary battery was prepared in the same manner as in Example 1-3, except that at the time of preparing a positive electrode, 2% by mass of neryl acetate was added to the positive electrode mixture slurry, but the citronellyl acetate was not added to the electrolytic solution.

Example 1-8

A secondary battery was prepared in the same manner as in Example 1-3, except that a 16 μm-thick separator having a two-layered structure composed of polyamide-imide/polyethylene (PAI/PE) was used as the separator. At that time, an assembling step was carried out such that the polyamide-imide layer was opposed to the positive electrode.

Example 1-9

A secondary battery was prepared in the same manner as in Example 1-3, except that a 16 μm-thick separator having a three-layered structure composed of polypropylene/polyethylene/polypropylene (PP/PE/PP) was used as the separator.

Example 1-10

A secondary battery was prepared in the same manner as in Example 1-3, except that the 4-fluoro-1,3-dioxolan-2-one (FEC) was not added to the electrolytic solution. On that occasion, ethylene carbonate, propylene carbonate, dimethyl carbonate and ethyl methyl carbonate as other solvents were mixed in the same molar fraction ratio.

Example 1-11

A secondary battery was prepared in the same manner as in Example 1-3, except that 4,5-difluoro-1,3-dioxolan-2-one (DFEC) was added to the electrolytic solution in place of the 4-fluoro-1,3-dioxolan-2-one.

Example 1-12

A secondary battery was prepared in the same manner as in Example 1-3, except that β-citronellol was added to the electrolytic solution in place of the citronellyl acetate.

Example 1-13

A secondary battery was prepared in the same manner as in Example 1-3, except that neryl acetate was added to the electrolytic solution in place of the citronellyl acetate.

Example 1-14

A secondary battery was prepared in the same manner as in Example 1-3, except that nerol was added to the electrolytic solution in place of the citronellyl acetate.

Example 1-15

A secondary battery was prepared in the same manner as in Example 1-3, except that a compound obtained deriving β-citronellol into a lithium alkoxide was added to the electrolytic solution in place of the citronellyl acetate.

Example 1-16

A secondary battery was prepared in the same manner as in Example 1-3, except that cis-6-nonenyl acetate was added to the electrolytic solution in place of the citronellyl acetate.

Example 1-17

A secondary battery was prepared in the same manner as in Example 1-3, except that cis-6-nonen-1-ol was added to the electrolytic solution in place of the citronellyl acetate.

Example 1-18

A secondary battery was prepared in the same manner as in Example 1-3, except that cis-5-octen-1-ol was added to the electrolytic solution in place of the citronellyl acetate.

Example 1-19

A secondary battery was prepared in the same manner as in Example 1-3, except that (3,7-dimethyl-6-octenyloxy)-trimethyl-silane was added to the electrolytic solution in place of the citronellyl acetate.

Example 1-20

A secondary battery was prepared in the same manner as in Example 1-3, except that 2-(3-butenyl)-oxirane was added to the electrolytic solution in place of the citronellyl acetate.

Comparative Examples 1-1 to 1-5

Secondary batteries were prepared in the same manners as in Examples 1-1 to 1-5, respectively, except that the citronellyl acetate was not added to the electrolytic solution.

Comparative Examples 1-6 to 1-9

Secondary batteries were prepared in the same manners as in Examples 1-8 to 1-11, respectively, except that the citronellyl acetate was not added to the electrolytic solution.

The secondary batteries of Examples 1-1 to 1-20 and Comparative Examples 1-1 to 1-9 were evaluated with respect to capacity retention rate (%) after 200 cycles, OCV percent defective (%) after high-temperature storage and overcharge characteristic in the following methods. The results are shown in Table 1.

<Capacity Retention Rate (%) after 200 Cycles>

The battery was charged at a constant-current density of 1 $mA/cm^2$ in an atmosphere at 25° C. until the battery voltage reached a prescribed voltage and then subjected to constant-voltage charge at a prescribed voltage until the current density reached 0.02 $mA/cm^2$; and the battery was discharged at a constant-current density of 1 $mA/cm^2$ until the battery voltage reached 3.0 V, thereby measuring an initial capacity. Furthermore, charge and discharge were repeated under the same condition as in the case of determining an initial capacity, thereby measuring a discharge capacity at the 200th cycle. Then, a capacity retention rate (%) relative to the initial capacity was determined according to the following expression.

Capacity retention rate (%)=(Discharge capacity after 200 cycles)/(Initial capacity)×100

<OCV Percent Defective (%) after High-Temperature Storage>

The battery was charged at a constant-current density of 1 $mA/cm^2$ in an atmosphere at 25° C. until the battery voltage reached a prescribed voltage and then subjected to constant-voltage charge at a prescribed voltage until the current density reached 0.02 $mA/cm^2$. Thereafter, this battery was stored at 85° C. for 5 days. The battery voltage was measured before and after the storage, and a voltage difference therebetween was calculated as a voltage drop amount ΔV.

The case where the ΔV was 5 mV or more was defined to be an open circuit voltage defective (OCV defective). Here, among the 200 batteries, a proportion of batteries with OCV defective was expressed by a percentage (%) and defined to be an OCV percent defective.

<Overcharge Characteristic>

With respect to the overcharge characteristic, charge and discharge were repeated by 2 cycles or 100 cycles, and the secondary battery was then overcharged, thereby examining an appearance thereof. On that occasion, the test number under the both cycle conditions was set to be three (so-called "N=3"). As to the evaluation results, the case where ignition or the like (ignition or smoking) was not confirmed with respect to all of the three test samples was defined to be "good"; and the case where ignition or the like was confirmed with respect to even one of the three test samples was defined to be "bad".

On the occasion of examining the overcharge characteristic after 2 cycles, after performing the charge and discharge of 2 cycles in an atmosphere at 23° C., the battery was overcharged. As to the charge and discharge condition of one cycle, the battery was charged up to an upper limit voltage of 4.2 V at a constant-current density of 0.2 C, subsequently charged at a constant voltage of 4.2 V for 3 hours and then discharged up to a final voltage of 2.5 V at a constant-current density of 0.2 C. The term "0.2 C" as referred to herein is a current value at which a theoretical capacity is completely discharged for 5 hours. Also, as to the overcharge condition, the battery was charged up to an upper limit voltage of 12 V at a constant-current density of 1C, or charged at the same current density until the charge time reached 3 hours.

On the occasion of examining the overcharge characteristic after 100 cycles, after performing the charge and discharge of 100 cycles in an atmosphere at 23° C., the battery was overcharged. The charge and discharge condition and the overcharge condition of one cycle were the same as those in the case of examining the overcharge characteristic after 2 cycles.

acteristic after both 2 cycles and 100 cycles is significantly enhanced. Even in the case of increasing the charge final voltage, this effect endures, and therefore, a high-capacity secondary battery can be realized.

It is noted from Example 1-6 that even in the battery using the positive electrode prepared by adding citronellyl acetate to the positive electrode mixture slurry, high effects the same as those in the case of adding citronellyl acetate to the electrolytic solution are obtained. Also, it is noted from Example 1-7 that even in the battery prepared by adding neryl acetate to the positive electrode mixture slurry, high effects are obtained.

It was noted from Examples 1-8 and 1-9 and Comparative Examples 1-6 and 1-7 that even in the case of using the separator having a two-layered or three-layered structure in

TABLE 1

| | Overcharge voltage | Additive Electrolytic solution | Additive Positive electrode | FEC amount (%) | DFECT amount (%) | Separator | Capacity retention rate after 200 cycles (%) | OCV percent defective after high-temperature storage (%) | Overcharge characteristic After 2 cycles | Overcharge characteristic After 100 cycles |
|---|---|---|---|---|---|---|---|---|---|---|
| Example 1-1 | 4.2 V | Citronellyl acetate | — | 10 | 0 | PE | 91 | 0 | Good | Good |
| Example 1-2 | 4.25 V | Citronellyl acetate | — | 10 | 0 | PE | 88 | 0 | Good | Good |
| Example 1-3 | 4.35 V | Citronellyl acetate | — | 10 | 0 | PE | 83 | 0 | Good | Good |
| Example 1-4 | 4.45 V | Citronellyl acetate | — | 10 | 0 | PE | 76 | 0 | Good | Good |
| Example 1-5 | 4.55 V | Citronellyl acetate | — | 10 | 0 | PE | 72 | 0 | Good | Good |
| Example 1-6 | 4.35 V | — | Citronellyl acetate | 10 | 0 | PE | 85 | 0 | Good | Good |
| Example 1-7 | 4.35 V | — | Neryl acetate | 10 | 0 | PE | 83 | 0 | Good | Good |
| Example 1-8 | 4.35 V | Citronellyl acetate | — | 10 | 0 | PAI/PE | 80 | 0 | Good | Good |
| Example 1-9 | 4.35 V | Citronellyl acetate | — | 10 | 0 | PP/PE/PP | 81 | 0 | Good | Good |
| Example 1-10 | 4.35 V | Citronellyl acetate | — | 0 | 0 | PE | 80 | 0 | Good | Good |
| Example 1-11 | 4.35 V | Citronellyl acetate | — | 0 | 10 | PE | 84 | 0 | Good | Good |
| Example 1-12 | 4.35 V | β-Citronellol | — | 10 | 0 | PE | 82 | 0 | Good | Good |
| Example 1-13 | 4.35 V | Neryl acetate | — | 10 | 0 | PE | 84 | 0 | Good | Good |
| Example 1-14 | 4.35 V | Nerol | — | 10 | 0 | PE | 82 | 0 | Good | Good |
| Example 1-15 | 4.35 V | Li salt of β-citronellol | — | 10 | 0 | PE | 85 | 0 | Good | Good |
| Example 1-16 | 4.35 V | Cis-6-nonenyl acetate | — | 10 | 0 | PE | 81 | 0 | Good | Good |
| Example 1-17 | 4.35 V | Cis-6-nonen-1-ol | — | 10 | 0 | PE | 82 | 0 | Good | Good |
| Example 1-18 | 4.35 V | Cis-5-octen-1-ol | — | 10 | 0 | PE | 83 | 0 | Good | Good |
| Example 1-19 | 4.35 V | (3,7-Dimethyl-6-octenyloxy)-trimethyl-silane | — | 10 | 0 | PE | 81 | 0 | Good | Good |
| Example 1-20 | 4.35 V | 2-(3-Butenyl)-oxirane | — | 10 | 0 | PE | 83 | 0 | Good | Good |
| Comparative Example 1-1 | 4.2 V | — | — | 10 | 0 | PE | 89 | 0 | Good | Good |
| Comparative Example 1-2 | 4.25 V | — | — | 10 | 0 | PE | 85 | 0 | Good | Good |
| Comparative Example 1-3 | 4.35 V | — | — | 10 | 0 | PE | 75 | 0 | Good | Bad |
| Comparative Example 1-4 | 4.45 V | — | — | 10 | 0 | PE | 65 | 0 | Bad | Bad |
| Comparative Example 1-5 | 4.55 V | — | — | 10 | 0 | PE | 60 | 0 | Bad | Bad |
| Comparative Example 1-6 | 4.35 V | — | — | 10 | 0 | PAI/PE | 71 | 0 | Good | Bad |
| Comparative Example 1-7 | 4.35 V | — | — | 10 | 0 | PP/PE/PP | 73 | 0 | Good | Bad |
| Comparative Example 1-8 | 4.35 V | — | — | 0 | 0 | PE | 72 | 0 | Good | Bad |
| Comparative Example 1-9 | 4.35 V | — | — | 0 | 10 | PE | 74 | 0 | Good | Bad |

In comparing Examples 1-1 to 1-5 and Comparative Examples 1-1 to 1-5, it was noted that in the case where citronellyl acetate is added, the capacity retention rate (%) after 200 cycles is enhanced. Then, the OCV percent defective after high-temperature storage is 0, and therefore, it may be said that an excellent high-temperature storage characteristic is revealed. Also, it was noted that the overcharge charplace of the polyethylene separator, the use of citronellyl acetate enhances the capacity retention rate (%) after 200 cycles and reveals excellent high-temperature storage characteristic and overcharge characteristic after both 2 cycles and 100 cycles.

It is noted from Examples 1-10 and 1-11 and Comparative Examples 1-8 and 1-9 that by using citronellyl acetate, a high overcharge characteristic is obtained even in the case where the electrolytic solution does not contain 4-fluoro-1,3-dioxolan-2-one or the case where 4,5-difluoro-1,3-dioxolan-2-one is added in place of the 4-fluoro-1,3-dioxolan-2-one.

It was noted from Examples 1-12 to 1-20 that the use of a chain compound having a hydroxyl group and a carbon-carbon double bond, a light metal alkoxide thereof or a derivative thereof obtained by substituting the hydroxyl group with a protective group enhances the capacity retention rate (%) after 200 cycles and reveals excellent high-temperature storage characteristic and overcharge characteristic after both 2 cycles and 100 cycles.

Comparative Examples 2-1

A secondary battery was prepared in the same manner as in Example 1-6, except that at the time of preparing a positive electrode, 12% by mass of citronellyl acetate to be added to the positive electrode mixture slurry was added. The positive electrode mixture slurry was prepared such that the composition ratio of other constituent components was identical.

The thus obtained secondary batteries were evaluated with respect to the capacity retention rate (%) after 200 cycles, the OCV percent defective (%) after high-temperature storage and the overcharge characteristic. The obtained results are shown in Table 2.

TABLE 2

| | | Addition amount (% by mass) | | Capacity retention rate after 200 cycles (%) | OCV percent defective after high-temperature storage (%) | Overcharge characteristic | |
|---|---|---|---|---|---|---|---|
| | Additive | Positive electrode | Electrolytic solution | | | After 2 cycles | After 100 cycles |
| Example 2-1 | Citronellyl acetate | — | 0.01 | 80 | 0 | Good | Good |
| Example 2-2 | Citronellyl acetate | — | 1 | 82 | 0 | Good | Good |
| Example 1-3 | Citronellyl acetate | — | 2 | 83 | 0 | Good | Good |
| Example 2-3 | Citronellyl acetate | — | 5 | 81 | 0 | Good | Good |
| Example 2-4 | Citronellyl acetate | — | 10 | 80 | 0 | Good | Good |
| Example 2-5 | Citronellyl acetate | 0.01 | — | 81 | 0 | Good | Good |
| Example 2-6 | Citronellyl acetate | 1 | — | 83 | 0 | Good | Good |
| Example 1-6 | Citronellyl acetate | 2 | — | 85 | 0 | Good | Good |
| Example 2-7 | Citronellyl acetate | 5 | — | 84 | 0 | Good | Good |
| Example 2-8 | Citronellyl acetate | 10 | — | 81 | 0 | Good | Good |
| Comparative Example 2-1 | Citronellyl acetate | — | 12 | 78 | 0 | Good | Good |
| Comparative Example 2-2 | Citronellyl acetate | 12 | — | 79 | 0 | Good | Good |
| Comparative Example 1-3 | — | — | — | 75 | 0 | Good | Bad |

Examples 2-1 to 2-4

Secondary batteries were prepared in the same manner as in Example 1-3, except that the content of citronellyl acetate in the electrolytic solution was changed from 0.01% by mass to 10% by mass as shown in Table 2. Each of the electrolytic solutions was prepared such that the composition ratio of other constituent components was identical.

Examples 2-5 to 2-8

Secondary batteries were prepared in the same manner as in Example 1-6, except that at the time of preparing a positive electrode, the content of citronellyl acetate to be added to the positive electrode mixture slurry was changed from 0.01% by mass to 10% by mass as shown in Table 2. Each of the positive electrode mixture slurries was prepared such that the composition ratio of other constituent components was identical.

Comparative Examples 2-1

A secondary battery was prepared in the same manner as in Example 1-3, except that 12% by mass of citronellyl acetate was added to the electrolytic solution. The electrolytic solution was prepared such that the composition ratio of other constituent components was identical.

In comparing Examples 2-1 to 2-4, Example 1-3 and Comparative Example 2-1, it was noted that by adding citronellyl acetate in an amount ranging from 0.01% by mass to 10% by mass to the electrolytic solution, 80% or more of a capacity retention rate after 200 cycles is obtainable. Also, it may be said that Examples 2-1 to 2-4 and Example 1-3 are also excellent in the high-temperature storage characteristic because the OCV percent defective after high-temperature storage is still 0.

In comparing Examples 2-5 to 2-8, Example 1-6 and Comparative Example 2-2, it was noted that by adding citronellyl acetate in an amount ranging from 0.01% by mass to 10% by mass to the positive electrode mixture slurry, 80% or more of a capacity retention rate after 200 cycles is obtainable. Also, it may be said that Examples 2-5 to 2-8 and Example 1-6 are also excellent in the high-temperature storage characteristic because the OCV percent defective after high-temperature storage is still 0.

Examples 3-1 to 3-6 and Comparative Example 3-1

Secondary batteries were prepared in the same manner as in Example 1-3, except that the composition of the solvent in the electrolytic solution was changed as shown in Table 3. On that occasion, the content of 4-fluoro-1,3-dioxolan-2-one (FEC) as a halogen atom-containing cyclic carbonate was successively increased such that the mass ratio of the high-dielectric solvent and the low-viscosity solvent was identical.

TABLE 3

| | Composition of electrolytic solution | | | | | | Capacity retention rate after 200 cycles (%) | OCV percent defective after high-temperature storage (%) | Overcharge characteristic | |
|---|---|---|---|---|---|---|---|---|---|---|
| | EC | PC | DMC | EMC | FEC | Citronellyl acetate | | | After 2 cycles | After 100 cycles |
| Example 3-1 | 29.99 | 5 | 58 | 5 | 0.01 | 2 | 81 | 0 | Good | Good |
| Example 3-2 | 29 | 5 | 58 | 5 | 1 | 2 | 81 | 0 | Good | Good |
| Example 3-3 | 28 | 5 | 58 | 5 | 2 | 2 | 83 | 0 | Good | Good |
| Example 3-4 | 25 | 5 | 58 | 5 | 5 | 2 | 84 | 0 | Good | Good |
| Example 1-3 | 20 | 5 | 58 | 5 | 10 | 2 | 83 | 0 | Good | Good |
| Example 3-5 | 10 | 5 | 58 | 5 | 20 | 2 | 83 | 0 | Good | Good |
| Example 3-6 | 0 | 5 | 58 | 5 | 30 | 2 | 81 | 0 | Good | Good |
| Comparative Example 3-1 | 0 | 0 | 58 | 5 | 35 | 2 | 79 | 0 | Good | Good |
| Comparative Example 1-3 | 20 | 5 | 58 | 5 | 10 | 0 | 75 | 0 | Good | Bad |

In comparing Examples 3-1 to 3-6 and Comparative Example 3-1, it was noted that by incorporating a halogen atom-containing cyclic carbonate along with citronellyl acetate into the electrolytic solution and regulating its content in the range of from 0.01 to 30% by mass, the capacity retention rate (%) after 200 cycles is enhanced, and the high-temperature storage characteristic and the overcharge characteristic after both 2 cycles and 100 cycles are excellent.

While the present invention has been described with reference to the embodiments and working examples, it should not be construed that the present invention is limited to the foregoing embodiments and working examples, but various modifications can be made. For example, while the secondary battery having a wound structure has been described in the foregoing embodiments and working examples, the present invention is similarly applicable to secondary batteries having a structure in which a positive electrode and a negative electrode are folded or stacked. In addition, the present invention is also applicable to secondary batteries of a so-called coin type, button type, rectangular type or laminated film type or the like.

Also, in the foregoing embodiments and working examples, while the case of using an electrolytic solution has been described, the present invention is similarly applicable to the case of using other electrolyte. Examples of other electrolyte include an electrolyte in a so-called gel state in which an electrolytic solution is held in a polymer compound.

Furthermore, in the foregoing embodiments and working examples, while a so-called lithium ion secondary battery in which the capacity of a negative electrode is expressed by a capacity component due to intercalation and deintercalation of lithium has been described, the present invention is similarly applicable to a so-called lithium metal secondary battery in which a lithium metal is used for a negative electrode active material, and the capacity of a negative electrode is expressed by a capacity component due to deposition and dissolution of lithium; or a secondary battery in which by making the charge capacity of a negative electrode material capable of intercalating and deintercalating lithium smaller than the charge capacity of a positive electrode, the capacity of a negative electrode includes a capacity component due to intercalation and deintercalation of lithium and a capacity component due to deposition and dissolution of lithium and is expressed by the total sum thereof.

Also, in the foregoing embodiments and working examples, while a battery using lithium as an electrode reactant has been described, the present invention is similarly applicable to the case of using other alkali metal such as sodium (Na) and potassium (K), an alkaline earth metal such as magnesium and calcium (Ca), or other light metal such as aluminum.

According to the embodiments of the present application, a nonaqueous electrolyte secondary battery having excellent cycle characteristic and high-temperature characteristic as well as overcharge safety can be formed.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A nonaqueous electrolytic solution comprising an electrolyte salt dissolved in a nonaqueous solvent, wherein
the nonaqueous electrolyte solution contains at least one compound selected from the group consisting of a chain compound having a hydroxyl group and a carbon-carbon double bond, a light metal alkoxide thereof and a derivative thereof obtained by substituting the hydroxyl group with a protective group, and
wherein the chain compound have a hydroxyl group and a carbon-carbon double bond, the light metal alkoxide thereof or the derivative thereof obtained by substituting the hydroxyl group with a protective group is any one of compounds represented by the following formulae (1) to (6):

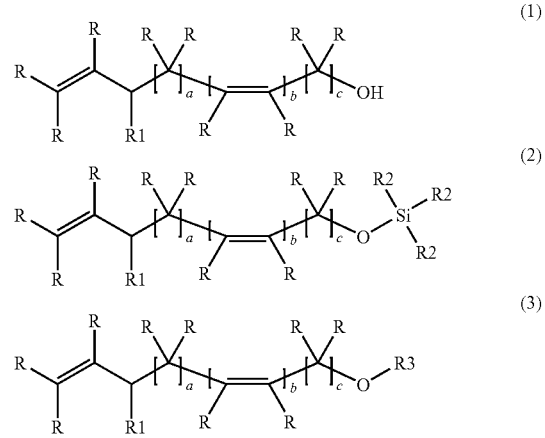

-continued

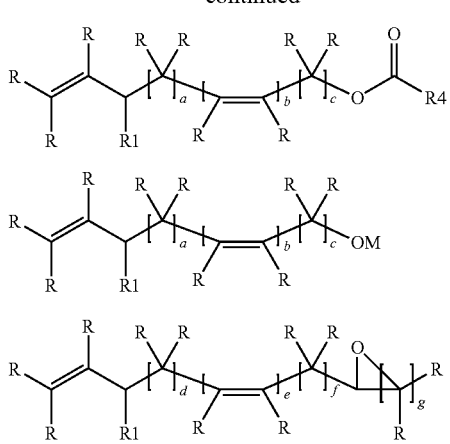

wherein
each of R and R1 represents a hydrogen atom, a halogen atom, a vinyl group, an alkyl group having from 1 to 4 carbon atoms or a halogenated alkyl group having from 1 to 4 carbon atoms in which at least one hydrogen atom is substituted with a halogen atom, and R and R1 may be the same as or different from each other;
R2 represents a methyl group, an ethyl group, an isopropyl group, a tertiary butyl group or a phenyl group, and each R2 may be the same as or different from every other R2;
R3 represents a hydrocarbon group having from 1 to 10 carbon atoms or a hydrocarbon group having from 1 to 10 carbon atoms, a part of which is substituted with a functional group containing a hetero element inclusive of oxygen (O) or silicon (Si);
R4 represents a methyl group, a tertiary butyl group or an aryl group;
M represents an alkali metal element;
each of a, b and c represents an integer of from 0 to 5 and satisfies the relationship of $\{1 \leq (a+2b+c) \leq 5\}$;
each of d, e and f represents an integer of from 0 to 4 and satisfies the relationship of $\{1 \leq (d+2e+f) \leq 4\}$; and
g represents an integer of from 1 to 5.

2. The nonaqueous electrolytic solution according to claim 1, wherein
the compound is represented by one of the formulae (1) to (5) wherein (a+2b+c) is equal to 4, and R1 is a hydrogen atom; or
the compound is represented by the formula (6) wherein (d+2e+f) is equal to 4, and R1 represents a hydrogen atom.

3. The nonaqueous electrolytic solution according to claim 1, wherein
the at least one compound selected from the group consisting of a chain compound having a hydroxyl group and a carbon-carbon double bond, the light metal alkoxide thereof or the derivative thereof obtained by substituting the hydroxyl group with a protective group is included in an amount ranging from 0.01 to 10% by mass in the nonaqueous electrolytic solution.

4. A positive electrode comprising:
a positive electrode mixture containing a positive electrode active material, wherein
the positive electrode mixture contains at least one compound selected from the group consisting of a chain compound having a hydroxyl group and a carbon-carbon double bond, a light metal alkoxide thereof and a derivative thereof obtained by substituting the hydroxyl group with a protective group, and
wherein the chain compound has a hydroxyl group and a carbon-carbon double bond, the light metal alkoxide thereof or the derivative thereof obtained by substituting the hydroxyl group with a protective group is any one of compounds represented by the following formulae (1) to (6):

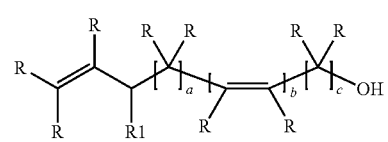

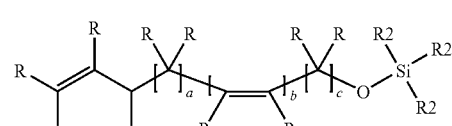

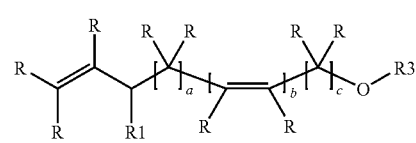

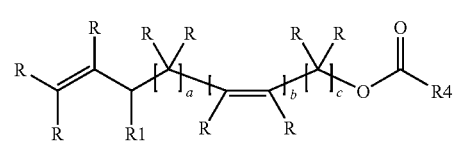

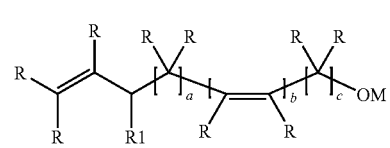

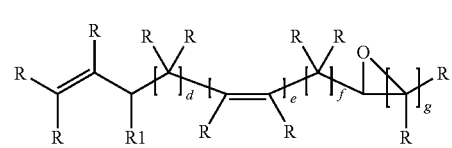

wherein
each of R and R1 represents a hydrogen atom, a halogen atom, a vinyl group, an alkyl group having from 1 to 4 carbon atoms or a halogenated alkyl group having from 1 to 4 carbon atoms in which at least one hydrogen atom is substituted with a halogen atom, and R and R1 may be the same as or different from each other;
R2 represents a methyl group, an ethyl group, an isopropyl group, a tertiary butyl group or a phenyl group, and each R2 may be the same as or different from every other R2;
R3 represents a hydrocarbon group having from 1 to 10 carbon atoms or a hydrocarbon group having from 1 to 10 carbon atoms, a part of which is substituted with a functional group containing a hetero element inclusive of oxygen (O) or silicon (Si);
R4 represents a methyl group, a tertiary butyl group or an aryl group;
M represents an alkali metal element;
each of a, b and c represents an integer of from 0 to 5 and satisfies the relationship of $\{1 \leq (a+2b+c) \leq 5\}$;
each of d, e and f represents an integer of from 0 to 4 and satisfies the relationship of $\{1 \leq (d+2e+f) \leq 4\}$; and
g represents an integer of from 1 to 5.

5. The positive electrode according to claim 4, wherein
the at least one compound selected from the group consisting of a chain compound having a hydroxyl group and a carbon-carbon double bond, the light metal alkoxide thereof or the derivative thereof obtained by substituting the hydroxyl group with a protective group is included in an amount ranging from 0.01 to 10% by mass in the nonaqueous electrolytic solution.

6. A nonaqueous electrolyte secondary battery comprising:
a positive electrode;
a negative electrode;
a separator; and
a nonaqueous electrolytic solution, wherein
at least one of the nonaqueous electrolytic solution and the positive electrode contains at least one compound selected from the group consisting of a chain compound having a hydroxyl group and a carbon-carbon double bond, a light metal alkoxide thereof and a derivative thereof obtained by substituting the hydroxyl group with a protective group, and
wherein the chain compound has a hydroxyl group and a carbon-carbon double bond, the light metal alkoxide thereof or the derivative thereof obtained by substituting the hydroxyl group with a protective group to be contained in the nonaqueous electrolytic solution is any one of compounds represented by the following formulae (1) to (6):

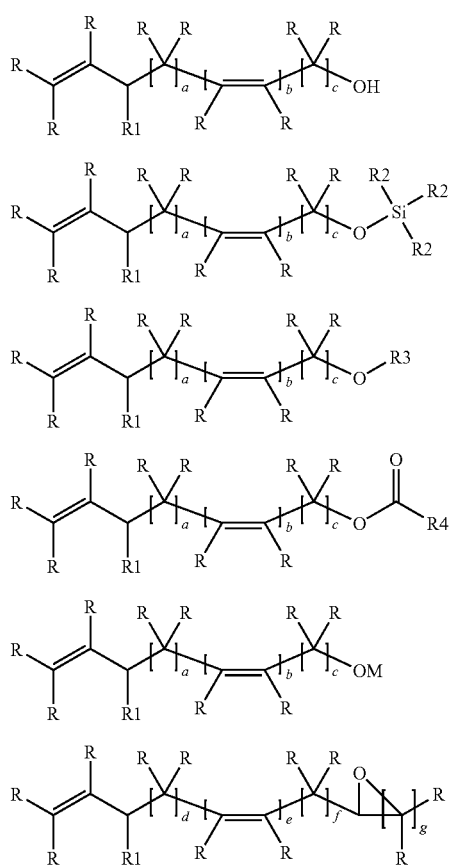

wherein
each of R and R1 represents a hydrogen atom, a halogen atom, a vinyl group, an alkyl group having from 1 to 4 carbon atoms or a halogenated alkyl group having from 1 to 4 carbon atoms in which at least one hydrogen atom is substituted with a halogen atom, and R and R1 may be the same as or different from each other;
R2 represents a methyl group, an ethyl group, an isopropyl group, a tertiary butyl group or a phenyl group, and each R2 may be the same as or different from every other R2;
R3 represents a hydrocarbon group having from 1 to 10 carbon atoms or a hydrocarbon group having from 1 to 10 carbon atoms, a part of which is substituted with a functional group containing a hetero element inclusive of oxygen (O) or silicon (Si);
R4 represents a methyl group, a tertiary butyl group or an aryl group;
M represents an alkali metal element;
each of a, b and c represents an integer of from 0 to 5 and satisfies the relationship of $\{1 \leq (a+2b+c) \leq 5\}$;
each of d, e and f represents an integer of from 0 to 4 and satisfies the relationship of $\{1 \leq (d+2e+f) \leq 4\}$; and
g represents an integer of from 1 to 5.

7. The nonaqueous electrolyte secondary battery according to claim 6, wherein
the at least one compound selected from the group consisting of a chain compound having a hydroxyl group and a carbon-carbon double bond, the light metal alkoxide thereof or the derivative thereof obtained by substituting the hydroxyl group with a protective group is included in an amount ranging from 0.01 to 10% by mass in the nonaqueous electrolytic solution.

8. The nonaqueous electrolyte secondary battery according to claim 6, wherein
a halogen atom-contained cyclic carbonate is included in an amount in the range of 0.01% by mass or more and not more than 30% by mass into the nonaqueous electrolytic solution.

9. The nonaqueous electrolyte secondary battery according to claim 8, wherein
the halogen atom-contained cyclic carbonate is 4-fluoro-1,3-dioxolan-2-one or 4,5-difluoro-1,3-dioxolan-2-one.

10. The nonaqueous electrolyte secondary battery according to claim 6, wherein
the separator has a single-layered structure composed of polyethylene or a multi-layered structure of two layers or three layers containing polyethylene and any material selected from the group consisting of polypropylene, polyvinylidene fluoride, polytetrafluoroethylene, aramid, polyimide, polyamide-imide and polyacrylonitrile.

11. The nonaqueous electrolyte secondary battery according to claim 6, wherein
an open circuit voltage in a completely charged state per pair of the positive electrode and the negative electrode is from 4.2 to 6.0 V.

12. A nonaqueous electrolyte secondary battery comprising:
a positive electrode;
a negative electrode;
a separator; and
a nonaqueous electrolytic solution, wherein
at least one of the nonaqueous electrolytic solution and the positive electrode contains at least one compound selected from the group consisting of a chain compound having a hydroxyl group and a carbon-carbon double bond, a light metal alkoxide thereof and a derivative thereof obtained by substituting the hydroxyl group with a protective group, and
wherein the chain compound having a hydroxyl group and a carbon-carbon double bond, the light metal alkoxide thereof or the derivative thereof obtained by substituting the hydroxyl group with a protective group to be contained in the positive electrode is any one of compounds represented by the following formulae (1) to (6):

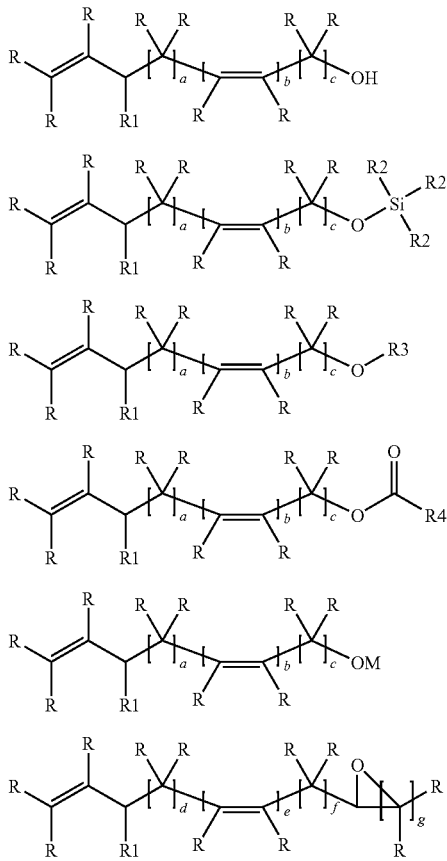

wherein each of R and R1 represents a hydrogen atom, a halogen atom, a vinyl group, an alkyl group having from 1 to 4 carbon atoms or a halogenated alkyl group having from 1 to 4 carbon atoms in which at least one hydrogen atom is substituted with a halogen atom, and R and R1 may be the same as or different from each other;

R2 represents a methyl group, an ethyl group, an isopropyl group, a tertiary butyl group or a phenyl group, and each R2 may be the same as or different from every other R2;

R3 represents a hydrocarbon group having from 1 to 10 carbon atoms or a hydrocarbon group having from 1 to 10 carbon atoms, a part of which is substituted with a functional group containing a hetero element inclusive of oxygen (O) or silicon (Si);

R4 represents a methyl group, a tertiary butyl group or an aryl group;

M represents an alkali metal element;

each of a, b and c represents an integer of from 0 to 5 and satisfies the relationship of $\{1 \leqq (a+2b+c) \leqq 5\}$;

each of d, e and f represents an integer of from 0 to 4 and satisfies the relationship of $\{1 \leqq (d+2e+f) \leqq 4\}$; and g represents an integer of from 1 to 5.

13. The nonaqueous electrolyte secondary battery according to claim 12, wherein the at least one compound selected from the group consisting of a chain compound having a hydroxyl group and a carbon-carbon double bond, the light metal alkoxide thereof or the derivative thereof obtained by substituting the hydroxyl group with a protective group is included in an amount ranging from 0.01 to 10% by mass in the positive electrode.

* * * * *